US007115848B1

(12) United States Patent
Zinter et al.

(10) Patent No.: US 7,115,848 B1
(45) Date of Patent: Oct. 3, 2006

(54) METHODS, SYSTEMS AND COMPUTER PROGRAM PRODUCTS FOR CALIBRATION OF MICROSCOPY IMAGING DEVICES

(75) Inventors: J. Robert Zinter, Rochester, NY (US); Stephen Chakmakjian, Honeoye Falls, NY (US)

(73) Assignee: Qioptiq Imaging Solutions, Inc., Fairport, NY (US)

( * ) Notice: Subject to any disclaimer, the term of this patent is extended or adjusted under 35 U.S.C. 154(b) by 0 days.

(21) Appl. No.: 10/953,646

(22) Filed: Sep. 29, 2004

(51) Int. Cl.
*G02B 27/40* (2006.01)
*G02B 27/64* (2006.01)
*G01D 5/36* (2006.01)

(52) U.S. Cl. .............. 250/201.3; 250/237 R; 356/609

(58) Field of Classification Search ............ 250/201.3, 250/237 R; 359/563; 356/609
See application file for complete search history.

(56) References Cited

U.S. PATENT DOCUMENTS

| | | | | |
|---|---|---|---|---|
| 4,629,234 A | * | 12/1986 | Sokolowski | 294/19.1 |
| 4,640,620 A | * | 2/1987 | Schmidt | 356/609 |
| 5,381,236 A | * | 1/1995 | Morgan | 356/609 |
| 6,239,909 B1 | * | 5/2001 | Hayashi et al. | 359/569 |
| 6,376,818 B1 | | 4/2002 | Wilson et al. | 250/201.3 |

FOREIGN PATENT DOCUMENTS

WO    WO 98/45745    10/1998

OTHER PUBLICATIONS

"Industrial Desktop Confocal Microscopy", OPTIGRID, Avimo Precision Instruments, pp. 1-10 (1993).
"Suddenly Everything Looks Different"; ApoTome, The performance. The price. The quality in imaging fluorescence-labeled specimens (1993).

* cited by examiner

*Primary Examiner*—Thanh X. Luu
*Assistant Examiner*—Stephen Yam
(74) *Attorney, Agent, or Firm*—Kenneth J. Lukacher

(57) ABSTRACT

An imaging system on which a calibration method is practiced includes: a light source; a substrate for supporting an object; a patterning mask that generates a substantially periodic spatial pattern on the object; a phase shifter that adjusts the relative position of the patterning mask and object to shift the position of the pattern on the object; a detector that detects images of the object; and an analyzer that analyzes at least three images of the object, each of which represents a different spatial shift of the pattern, the analyzer being configured to remove the spatial pattern from the images to generate an optically sectioned image of the object. The calibration method includes: calibrating the position of the mask relative to the substrate via a phase-voltage technique; calibrating the position of the mask relative to the substrate via a merit function technique; and operating the calibrated imaging system.

23 Claims, 26 Drawing Sheets

METHODS, SYSTEMS AND COMPUTER PROGRAM PRODUCTS FOR CALIBRATION OF MICROSCOPY IMAGING DEVICES

FIELD OF THE INVENTION

The present invention relates generally to microscopy imaging apparatus and an imaging method for generating an image which generally contains only in-focus detail, and more specifically to calibration techniques for same.

BACKGROUND OF THE INVENTION

With a conventional light microscope three-dimensional structures typically cannot be successfully imaged. Ordinarily, the resultant image consists of a sharp image of an in-focus region of a three-dimensional structure as well as defocused images of the structures above and below the in-focus region. A conventional light microscope is unable to reject out-of-focus detail.

Confocal microscopes have been developed which optically section a three-dimensional structure to provide in-focus images of individual layers or strata of the structure. These individual layers can be subsequently combined to form an in-focus three-dimensional image of the complete volume structure. Unfortunately, the light budget of confocal microscopes is generally poor when incoherent light sources are used. Laser scanning confocal microscopes can achieve a very shallow depth of focus, but typically require expensive apparatus and an illuminating/imaging pinhole through which the laser light is focused.

In U.S. Pat. No. 5,381,236 to Morgan, an optical sensor is described which is used to determine the range (distance) of individual features of a three-dimensional structure. The sensor has a periodic patterned light source that illuminates the structure and is reversible (i.e. the pattern is phase shifted 180°). An array of detector elements aligned with the pattern of the light source is used to detect an image of the pattern and the reversal of the pattern illuminating the structure. As the pattern is generally only imaged well on those parts of the structure which are themselves in focus, this enables the range (distance) of in-focus parts of the structure to be determined. A potential shortcoming of the apparatus and method described in Morgan can be that, in order to operate properly, the individual elements of the detector should be exactly aligned with and matched to the pattern of the light source. In practice this has been found to be almost impossible to achieve.

One solution to the problem is offered in U.S. Pat. No. 6,376,818 to Wilson et al., the disclosure of which is incorporated herein by reference in its entirety. The technique discussed in Wilson et al. involves the superposition of a periodic pattern of transparent and non-transparent stripes onto the object of interest. At least three images are recorded at different spatial phases of the pattern by means of a microscope with a shallow focal depth. A three-dimensional image composed of only in-focus detail is then derived from the recorded images (this technique is known in some circles as a "full-focus" technique). An exemplary system of this variety is the OPTIGRID™ microscopy system, available from Thales Optem, Fairport, N.Y.

Unfortunately, conventional microscopy imaging masks utilized, for example, by Wilson et al. can leave residual patterning in the final image. The degree of the residual pattern is a function of the intensity profile in the illumination pattern. Such residual patterning is undesirable since it raises doubt as to whether the pattern is part of the specimen or an artifact of the imaging process.

Because of the accessibility and easy fabrication, ronchi gratings (i.e., square waves) have been used in structured illumination. However, when imaged through band-limited systems (such as an optical system) the resultant image has residual patterns. This occurs because the ronchi grating passed through a linear band-limited system is the convolution of the ronchi grating and the point spread function (PSF) of the optics. The result is a square wave with rounded shoulders. It is at these shoulders where residual lines occur. For this reason, it is desirable with some systems to utilize "stripes" in the illumination pattern that vary sinusoidally in intensity.

One issue that can arise with full-focus techniques, and particularly those that utilize a set of sinusoidally-varying stripes in the pattern, is related to the calibration of the system. Generally speaking, microscopy errors can occur if the system is not precisely calibrated. In particular, it can be important to calibrate the location of a mask or similar device that produces the pattern of stripes, particularly as the mask is positioned for different phases. It would be desirable to improve performance of full-focus systems via new calibration techniques.

SUMMARY OF THE INVENTION

As a first aspect, embodiments of the present invention are directed to a method of calibrating an imaging system. The imaging system on which the method is practiced includes: a light source; a substrate for supporting an object; a patterning mask that generates a substantially periodic spatial pattern on the object; a phase shifter that adjusts the relative position of the patterning mask and object to shift the position of the pattern on the object; a detector that detects images of the object; and an analyzer that analyzes at least three images of the object, each of which represents a different spatial shift of the pattern, the analyzer being configured to remove the spatial pattern from the images to generate an optically sectioned image of the object. The method comprises: calibrating the position of the mask relative to the substrate via a phase-voltage technique; calibrating the position of the mask relative to the substrate via a merit function technique; and operating the calibrated imaging system.

As a second aspect, embodiments of the present invention are also directed to a method of calibrating an imaging system using a phase-voltage technique. In these embodiments, the imaging system includes: a light source; a substrate for supporting an object; a patterning mask that generates a substantially periodic spatial pattern on the object; a phase shifter that adjusts the position of the patterning mask to shift the position of the pattern on the object, the phase shifter including a piezoelectric device that adjusts the position of the mask responsive to an applied voltage; a detector that detects images of the object; and an analyzer that analyzes at least three images of the object, each of which represents a different spatial shift of the pattern, the analyzer being configured to remove the spatial pattern from the images to generate an optically sectioned image of the object. The method comprises the steps of: (a) generating Fourier Transform data for the phase and voltage of the system; (b) collecting phase data from the system; (c) calculating the phase for each data point of the phase data; (d) unwrapping the phase data to eliminate any $2\pi$ discontinuities therein; (e) determining whether each of the unwrapped data points are valid data points to eliminate data points that represent amplifier saturation; (f) identifying phase 1 and phase 2 data points that are nearest calculated values; and (g) interpolating between phase 1 and phase 2 data points identified in step (f) to establish phase 1 and phase 2 voltages.

As a third aspect, embodiments of the present invention are directed to a method of calibrating an imaging system using a merit function technique. In these embodiments, the imaging system includes: a light source; a substrate for supporting an object; a patterning mask that generates a substantially periodic spatial pattern on the object; a phase shifter that adjusts the relative position of the patterning mask and object to shift the position of the pattern on the object; a detector that detects images of the object; and an analyzer that analyzes at least three images of the object, each of which represents a different spatial shift of the pattern, the analyzer being configured to remove the spatial pattern from the images to generate an optically sectioned image of the object. The method comprises the steps of: (a) providing initial phase and voltage values for phases 1, 2 and 3; (b) normalizing one intensity frame; (c) processing a trio of intensity frames; (d) using the trio of frames from step (c), calculating the second harmonic of the resultant image and resulting merit function; (e) performing an inquiry regarding whether the merit function result is below a predetermined threshold value; (f) if step (e) provides a negative result, determining new phase and voltage step sizes; (g) calculating differential phase values with the data from step (f); (h) calculating derivative voltage values with the results from step (g); (i) obtaining imaging system data for a phase 1 derivative; (j) obtaining imaging system data for a phase 2 derivative; (k) calculating gradient differences and correction factors with the data from steps (g)–(j); (l) calculating new values of phases and voltages; and (m) repeating steps (a)–(l) until the merit function result is below the predetermined threshold value recited in step (e).

As a fourth aspect, embodiments of the present invention are directed to imaging systems. These systems comprise: a light source; a substrate for supporting an object; a patterning mask that generates a substantially periodic spatial pattern on the object; a phase shifter that adjusts the relative position of the patterning mask and object to shift the position of the pattern on the object; a detector that detects images of the object; and an analyzer that analyzes at least three images of the object, each of which represents a different spatial shift of the pattern, the analyzer being configured to remove the spatial pattern from the images to generate an optically sectioned image of the object. The system further comprises: means for calibrating the position of the mask relative to the substrate via a phase-voltage technique; and means for calibrating the position of the mask relative to the substrate via a merit function technique.

As a fifth aspect, embodiments of the present invention are directed to computer program products for calibrating an imaging system. The imaging system includes: a light source; a substrate for supporting an object; a patterning mask that generates a substantially periodic spatial pattern on the object; a phase shifter that adjusts the relative position of the patterning mask and object to shift the position of the pattern on the object; a detector that detects images of the object; and an analyzer that analyzes at least three images of the object, each of which represents a different spatial shift of the pattern, the analyzer being configured to remove the spatial pattern from the images to generate an optically sectioned image of the object. The computer program product comprises a computer usable storage medium having computer readable program code embodied in the medium, the computer readable program code comprising: computer readable program code that calibrates the imaging system using a phase-voltage technique; and computer readable program code that calibrates the imaging system using a merit function technique.

DETAILED DESCRIPTION OF EMBODIMENTS OF THE INVENTION

Figure 1:
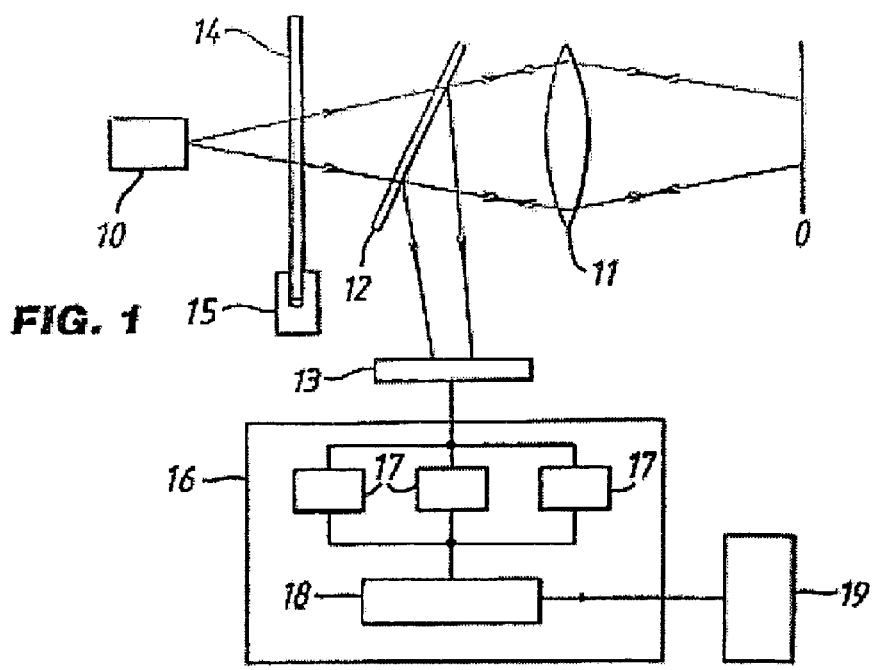
FIG. 1 is a schematic illustration of a microscopy imaging apparatus in accordance with the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

Basic Structure and Operation of the Imaging Apparatus

The imaging apparatus 8 shown in FIG. 1 has many of the features of a conventional microscope and in particular includes an incoherent light source 10 and a focusing component (preferably in the form of one or more lens 11) that focuses light from the light source 10 onto the object to be imaged O. A beam-splitter 12 is located between the light source 10 and the object O so the light reflected from the object O is reflected toward a light detector 13, which may be in the form of a CCD camera. In addition, the apparatus 8 includes a mask 14 which is patterned, for example in the form of a grating, and which is provided with the light source 10 so that the object O is illuminated with a non-zero, spatially substantially periodic pattern. The mask pattern is thus projected onto the object O. In some embodiments, the mask pattern has local periodicity in only one dimension. The detector plane is conjugate to the plane in which the projected pattern is focused to enable an optically sectioned image of the object O to be formed.

Referring again to FIG. 1, the apparatus 8 further includes a spatial phase shifter 15 for adjusting the spatial phase of the mask pattern focused on the object O such that at least three different phases of the mask pattern are generated. The phase shifter 15 may be in the form of a carriage for moving the mask 14 either incrementally or continuously relative to the object O so that the spatial phase of the patterned light focused on the object O can be altered. In the case of a mask 14 that is in the form of linear grating, the phase shifter 15 is arranged to move the grating perpendicular to the axis of the imaging apparatus 8. Such movement can be accomplished via a piezoelectric device in the phase shifter 15. Another option for adjusting the spatial phase includes movement of the beam splitter 12 so as to shift the phase of the projected pattern.

In the embodiment of the apparatus 8 illustrated in FIG. 1, the phase shifter 15 is configured to move the mask 14 to three predetermined positions located in a vertical plane perpendicular to the axis of the imaging apparatus 8 (into and out of the page). The three positions for the phase shifter 15 are chosen so that three different spatial phases of the mask 14 are focused on the object O. For example, the three phases may be: $\Phi$, $\Phi+120°$, and $\Phi+240°$. Alternative spatial phase shifts may be generated, for example: $\Phi$, $\Phi+90°$, $\Phi+180°$ and $\Phi$ 270°. With each of the two examples given above the angular difference between the individual spatial phases is the same.

Referring still to FIG. 1, the imaging apparatus 8 further includes an analyzer 16 connected to the detector 13 that analyzes the output of the detector 13. The analyzer 16 may include memory components 17, for example in the form of plurality of buffers, which separately store the three or more images of the object O, each of which is illuminated with different phases of the mask 14. The analyzer 16 further includes a pattern removal module 18 for analyzing the three or more stored images so as to remove the mask pattern from the images, thereby revealing an optically sectioned image of the object O. A 3-D imaging unit 19 is conveniently provided which may employs standard rendering techniques to generate a three-dimensional image of the object O through combining a plurality of different optically sectioned images, generated by the pattern removal module 18, at different focal positions. The pattern removal module 18 may operate to determine directly the in-focus image minus the fringing. For example, where three images are $I_1$, $I_2$, $I_3$, generated at three equally spaced spatial phases the in-focus image, I, can be determined by using the following equation:

$$I_p = \sqrt{(I_1-I_2)^2 + (I_1-I_3)^2 + (I_2-I_3)^2}$$

Implementing this procedure for each pixel of the image is, however, computationally intensive. Alternatively, to enable real-time imaging to be performed without the need for dedicated image processing apparatus, the analyzer 16 may include a look-up table connected to the pattern removal module 18. The look-up table is a tabulation of all possible solutions to the above equation with respect to the three input image values and enables the image I to be determined by reference to the table rather than through calculation of the solution of the equation for each pixel.

The imaging apparatus 8 described above takes advantage of the fact that any non-zero spatial frequency in the image of the object attenuates as the apparatus 8 is defocused. This means that the mask pattern can only be imaged well on those parts of the object O that are in focus and, thus, can provide a means of sectioning those parts of the object O that are in focus, albeit with an undesirable fringe pattern superimposed. By recording three or more images of the object at the same focal position but with different superimposed spatial phases of the pattern, it is possible for the images to be analyzed to remove the superimposed patterns to reveal an optically sectioned image of the object O.

In some embodiments, the mask 14 is in the form of a linear grating that varies sinusoidally in intensity. Alternating transparent and non-transparent bands of equal width are also suitable. A pattern of wider bands results in a thicker er optical section. Typical band widths include bands of 5–30 microns, 12½ microns in particular, though different widths will be appropriate according to the optical sectioning desired. However, any applied substantially periodic light intensity pattern may be employed. Suitable alternative masks include a spiral grating or pie-chart grating. Moreover, two-dimensional periodic patterns may also be used, such as a checkerboard pattern. An exemplary mask is described in co-assigned and co-pending U.S. patent application Ser. No. 10/953,140; filed concurrently, entitled "Illumination Masks that Produce Light Intensity Patterns Substantially Free of Harmonic Distortion".

As the pattern spacing determines the depth of the optical sectioning, it may be desirable that the pattern spacing (spatial periodicity) of the mask 14 is selected and the illumination magnification is arranged so that only the fundamental of the pattern is projected onto the object O. In the case of the linear square wave grating described above, in which the three phases of the grating $\Phi$, $\Phi+120°$ and $\Phi+240°$ are projected onto the object O, the third harmonic is automatically cancelled out in the subsequent processing of the three images and so it is not essential to avoid the third harmonic being projected on to the object O. This can provide greater freedom in the overall design of the imaging apparatus 8. In general, when the difference between the n phase shifts of the pattern projected onto the object O is the same in each case the $n^{th}$ harmonic and harmonics thereof are automatically cancelled out.

The imaging apparatus 8 described above employs three or more discrete predetermined phase shifts of the pattern that are projected onto the object O. Where the spatial phase of the pattern is varied continuously, for example using a rotating spiral mask or continuous movement of a grid-type mask, the images of the object O may be integrated over predetermined time periods to generate the optically sectioned image.

Figure 2:
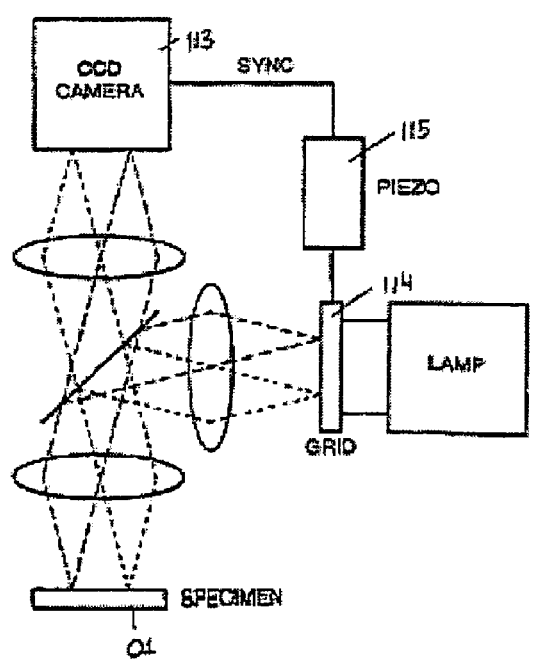
FIG. 2 is a schematic diagram of another embodiment of an optical system of the present invention.

A specific embodiment of an optical system of the present invention is illustrated in FIG. 2 and includes an illumination mask 114, $S(t_0, w_0)$ that is imaged onto an object O1 of amplitude transmittance or reflectance, $\tau(t_1, w_1)$. The final image is recorded by a CCD camera 113 in the image plane (t,w). The mask 114, the position of which is adjusted by a piezoelectrically-driven phase shifter 115, is illuminated incoherently which permits the image intensity to be expressed as $$I(t,w) = \int\int S(t_0,w_0) |\int\int h_1(t_0+t_1,w_0+w_1)\tau(t_1,w_1)h_2(t_1+t,w_1+w)dt_1dw_1|^2 dt_0 dw_0 \quad (1)$$

where $h_{1,2}$ represents the amplitude point spread functions of the two lenses. Optical co-ordinates (t,w) can be related to real co-ordinates (x,y) via $$(t, w) = 2\frac{\pi}{\lambda}(x, y)n\sin\alpha$$

where n sin α is the numerical aperture (NA) and λ denotes the wavelength. The illumination mask can be assumed to take the form of a one-dimensional grid, which for simplicity may be expressed as:

$$S(t_0, w_0) = 1 + m\cos(\nu t_0 + \phi_0) \quad (2)$$

where m denotes a modulation depth and $\Phi_O$ an arbitrary spatial phase. The normalised spatial frequency ν is related to the actually spatial frequency $\tilde{\nu}$ via $\nu = \beta\lambda\tilde{\nu}/NA$, where β denotes the magnification between the grid plane and the specimen plane. Substituting equation (2) into equation (1) gives:

$$I(t,w) = I_0 + I_c \cos\phi_0 + I_s \sin\phi_0 \quad (3)$$

where $I_O$ is given by equation (1) with S=1 and, of course, represents a conventional wide field image. $I_c$ and $I_s$ represent the image due to masks of the form m cos($\nu t_0$) and m sin($\nu t_0$) respectively. If $I_p = (I_C^2 + I_S^2)^{1/2}$, the grid pattern can be removed from the image of the specimen. This is achieved by taking three images, $I_1$, $I_2$ and $I_3$ corresponding to the relative spatial phases $\Phi_0 = 0$, $\Phi_0 = 2\pi/3$ and $\Phi_0 = 4\pi/3$ respectively. Thus obtained is an optically sectioned image, which does not contain $I_O$, by calculating $$I_p = \sqrt{(I_1 - I_2)^2 + (I_1 - I_3)^2 + (I_2 - I_3)^2}$$

The technique is analogous to square law detection in communications systems, and can be described also as grouping the recorded images into pairs of images and calculating the square root of the sum of the squares of the differences between the recorded images in each pair of images. Use of this technique is described in detail in Wilson et al., supra, and need not be described in further detail herein.

Calibration Techniques

Figure 2A:
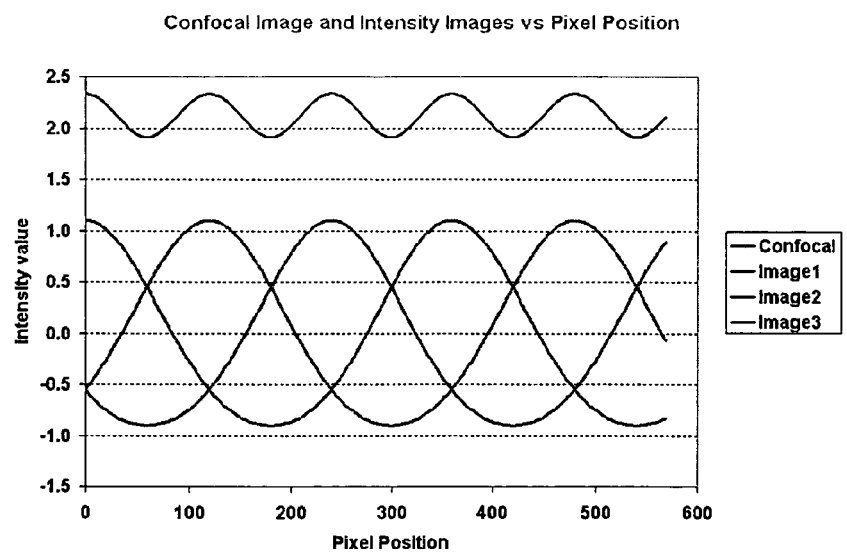
FIG. 2A is a graph illustrating the summation of three sine waves 120° apart with the introduction of a second harmonic into each sine wave.
Figure 2B:
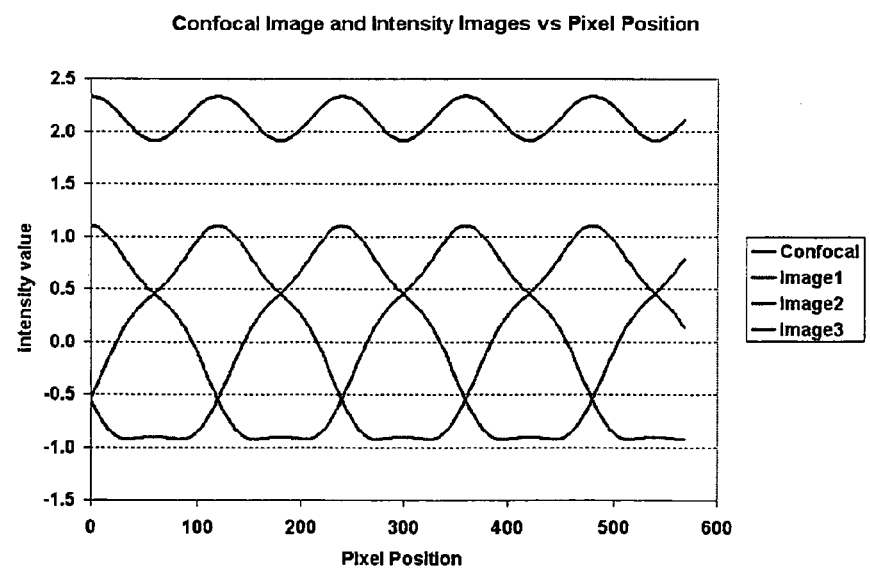
FIG. 2B is a graph illustrating the summation of three sine waves 120° apart with the introduction of a fourth harmonic into each sine wave.

Calibration of an imaging apparatus as described above can be very important to successful operation. In particular, it can be quite important that the location of the mask that imparts the grid on the object to be imaged, and in turn the location of the grid itself, is accurate, as only a small deviation from the intended phase can skew results. This can be especially true if a sine wave-type intensity gradient is employed in the creation of the grid. Under ideal conditions, a series of sine waves separated equally in phase over one period of the wave should, when summed, combine to form a straight line. However, if harmonics are introduced into the sine waves of the series, these can create disturbances in the sine waves such that the resultant sum is also a sine wave. As an example of this behavior, FIG. 2A illustrates a set of three sine waves separated in phase by 120 degrees. Each of these sine waves has a second harmonic that causes the lower portion of the wave to be thicker than the upper portion. The resulting summation (indicated by the top curve in FIG. 2A), which represents the confocal image of the input sine waves, is itself a sine wave (albeit of smaller amplitude than the original sine waves) rather than the desired straight line. FIG. 2B illustrates a similar summation for a $4^{th}$ harmonic of a sine wave.

The presence of $2^{nd}$, $4^{th}$ and other harmonics in the grid pattern in the imaging system manifests itself in the appearance of $3^{rd}$ order residual lines in the processed image. Residual lines result in misinformation in the processed image. Also, when a grid is not positioned accurately, then a second harmonic residual pattern appears on the processed image. The magnitude of residual lines can be 1.65%/degree of phase error. Thus, by positioning the grid accurately, the $2^{nd}$ harmonic content can similarly be reduced and/or minimized.

Figure 3:
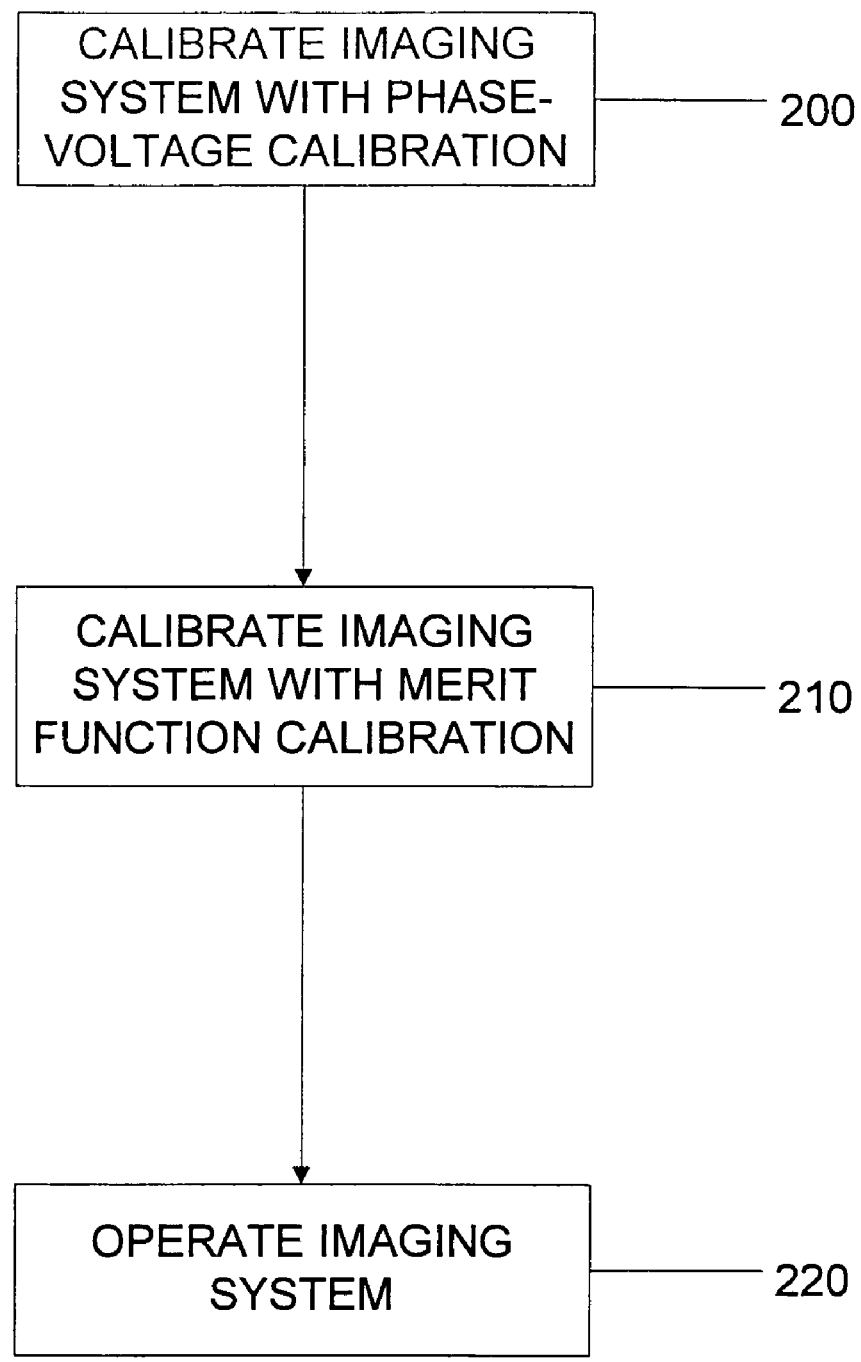
FIG. 3 is a flow chart illustrating a general calibration method according to embodiments of the present invention.

In some embodiments of the invention, the imaging system may be calibrated with a dual calibration method. Such a method is illustrated in FIG. 3. The method comprises first calibrating the imaging system with a phase-voltage calibration technique (Box 200), in the manner described below. The imaging system can then be further calibrated with a merit function calibration technique (Box 210), as is also described below. In many embodiments, the merit function calibration will follow that phase-voltage calibration and will include values from the phase-voltage calibration as its initial values. Once the imaging system has been calibrated, it can then be operated (Box 220).

Phase Calibration

One technique for calibrating an imaging apparatus of the present invention is to perform a phase-voltage calibration. This technique comprises mapping the measured voltage of a piezoelectric device acting as the phase shifter of the mask and mapping the corresponding position of the phase of the grid. This technique is completely analytic (particularly when employing a Fourier Transform of the magnitude and phase intensity) and can converge quickly to a solution if the $\Phi$, $\Phi+120'$, and $\Phi+240°$ phase conditions minimizes the residual lines.

Figure 4:
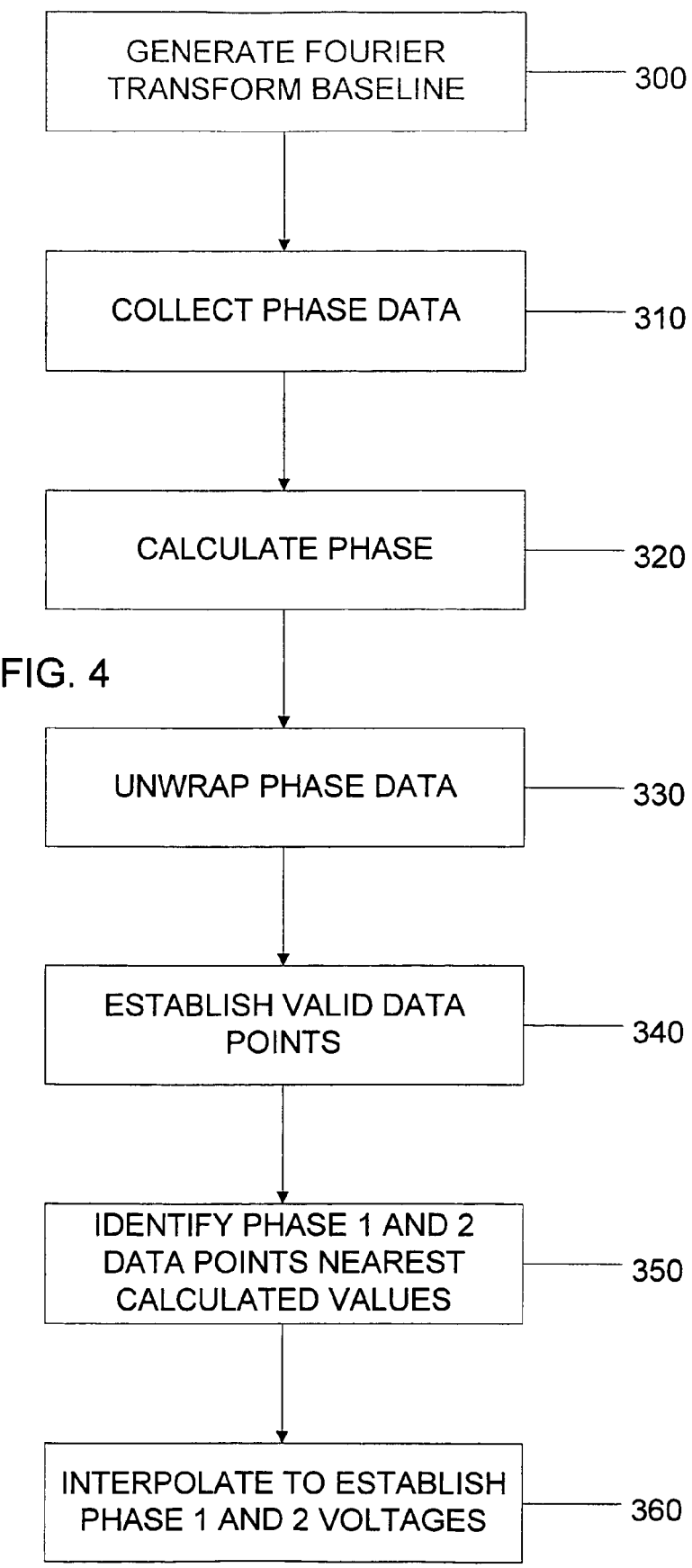
FIG. 4 is a flow chart illustrating a phase-voltage calibration method according to embodiments of the present invention.

Generally speaking, and with reference to FIG. 4, the method of phase-voltage calibration begins with the generation of a Fourier Transform baseline (Box 300); this can include finding the fundamental frequency and the noise floor. Once this information has been produced, phase data can be collected from the system (Box 310), typically at regularly spaced voltages. The phase is then calculated using the phase point at the same frequency bin as the fundamental peak (Box 320). The phase data is then unwrapped (Box 330) to ensure that discontinuities of $2\pi$ are accounted for. Valid data points are then identified (Box 340); in particular, invalid data points, such as those at the large drive voltage end of a derivative/voltage plot, are removed. The highest voltage is then established as the Phase 3 voltage, and the data points nearest the calculated Phase 1 and 2 values are identified (Box 350). Interpolation between the nearest neighbors to the calculated Phase 1 and 2 values can then be performed to establish Phase 1 and 2 voltage values (Box 360).

In this technique, certain parameters may be watched closely. For example, the phase should be monitored for both phase-unwrapping and for voltage saturation effects. As noted above, the phase of the grid is subject to a $2\pi$ phase discontinuity. If such a discontinuity is found, the data should be redistributed to allow a smooth representation thereof. This can be accomplished, for example, looking for a $2\pi$ phase jump, then removing it by adding or subtracting $2\pi$ to all subsequent data points. The result is an unwrapped phase plot (see FIGS. 12 and 13 and the descriptions thereof below).

The data may also be manipulated to eliminate a region at the large drive voltage end where the amplifier has been saturated and no further voltage increase accompanies increasing drive counts. The result is a flattening of the phase vs. voltage curve (see FIG. 13 below). Undesirable low or zero response regions can be eliminated being employing a "nearest-neighbor" derivative of the data. For example, the data can be used to find a maximum slope, then points with derivative values of less than a predetermined slope (e.g., one-half of the maximum slope) can be eliminated (see FIG. 14).

Figure 15:
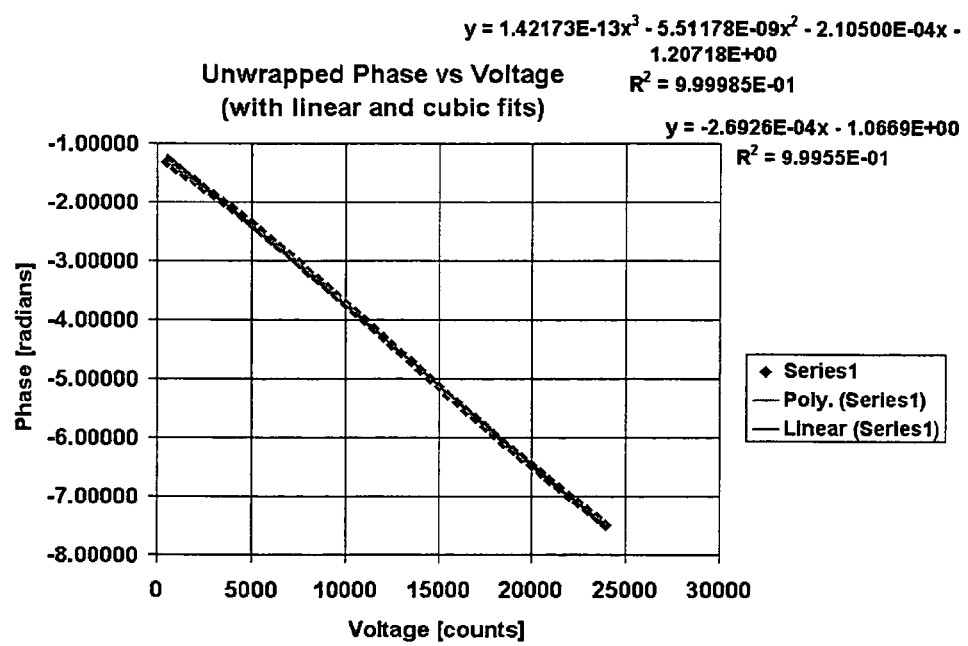
FIG. 15 is a plot of unwrapped phase as a function of voltage with invalid points eliminated for an imaging system of the present invention.

Once the data set is deemed to be acceptable (e.g., the $2\pi$ discontinuity and the voltage saturation effects have been eliminated), the data can be analyzed with a curve-fitting technique to interpolate values along the phase and voltage curve (see, e.g., FIG. 15). Exemplary curve-fitting techniques include linear and polynomial curve fitting; it has been determined that a cubic function may provide particularly suitable results.

Merit Function Calibration

Another technique for calibrating an imaging system of the present invention is a merit-function optimization technique. Because the second harmonic residual lines are generally undesirable, and because it has been determined that calibration error is a predominant, if not the only, source of second harmonic residual lines, a technique that seeks to minimize the impact of second harmonic residual lines should be effective in calibrating the imaging system.

If it is assumed that calibration error is the sole source for producing second harmonic residual lines, the second harmonic content of the residual lines can be a metric function for calibration. As such, a damped optimization routine based on this merit function can be employed.

For example, if a 3 phase system is in place (e.g., $\Phi$, $\Phi+120°$, and $\Phi+240°$), one of these phase steps can be employed as a reference, with the other two phase steps being variables. Using this as a basis, a map of the second harmonic can be plotted (see, e.g., FIGS. 17–22 below). Using a damped optimization process, operating on phase 2 ($\Phi+120°$) and phase 3 ($\Phi+240°$) steps, the magnitude of the $2^{nd}$ harmonic can be driven below a predetermined threshold level, such as the noise level of the camera.

Figure 21:
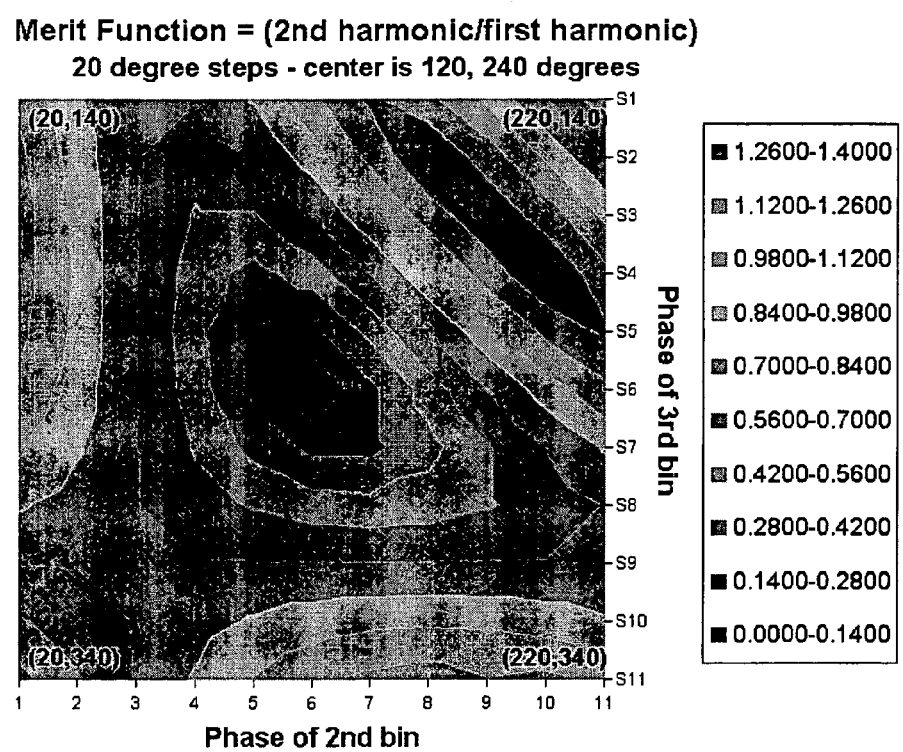
FIG. 21 is a plot of a merit function for large detuning (i.e., steps=20 degrees) of a second harmonic for an imaging system of the present invention.
Figure 23:
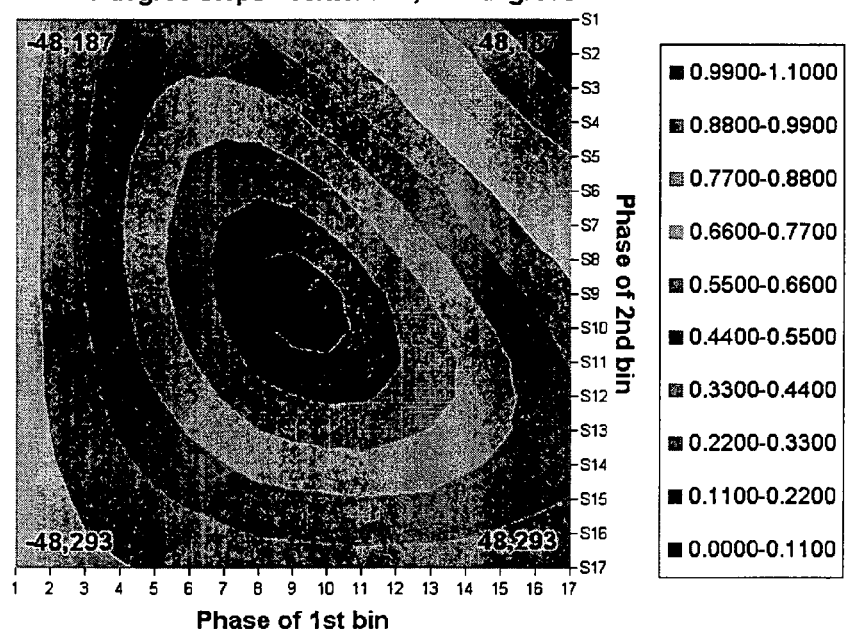
FIG. 23 is a plot of an experimental merit function of a second harmonic for an imaging system of the present invention.
Figure 25:
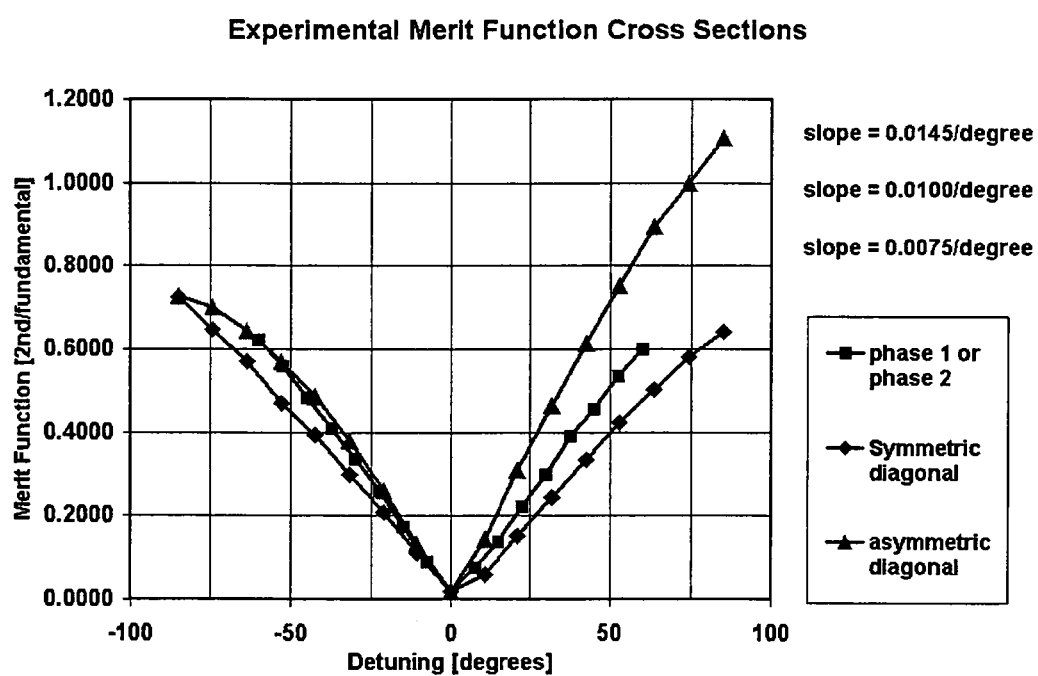
FIG. 25 is a plot of a cross-section of the merit function of FIG. 23.

As an example, if the initial starting values of phase positions 2 and 3 are within $\pm 25$ degrees of 120 and 240 degrees, the merit function remains essentially a sloped cone (see FIGS. 21, 23 and 25). Iteration of phases 2 and 3 can provide the "bottom" of the merit function.

Figure 5:
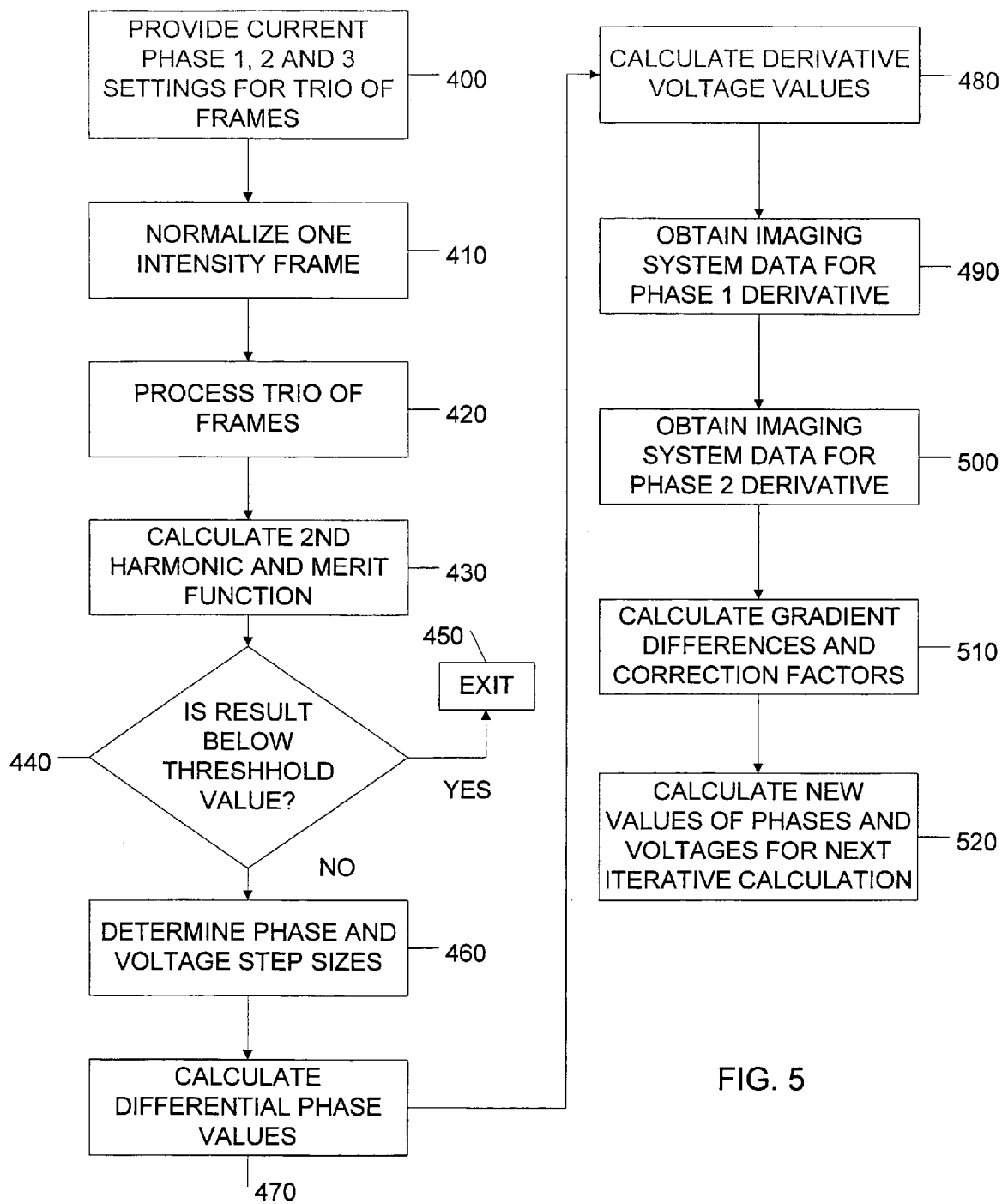
FIG. 5 is a flow chart illustrating a merit function calibration method according to embodiments of the present invention.

FIG. 5 illustrates this calibration method. Initially, phase settings for phases 1, 2 and 3 are provided (Box 400) (in some embodiments, these values are provided from the results of the phase-voltage calibration discussed above). One intensity frame is then normalized (Box 410). The trio of frames is then processed (Box 420), and the second harmonic and merit function are calculated (Box 430). At this point, an inquiry is made as to whether the resulting merit function has a minimum below a threshold value (Decision Box 440); in some embodiments, this threshold value is below about 0.7. If the merit function value is below the threshold value, the method is complete (Box 450); if not, the method proceeds to the calculation of an additional set of starting values. This begins with the determination of appropriate phase and voltage step sizes (Box 460). Differential phase values are then calculated (Box 470), as are derivative voltage values (Box 480). Imaging system data for the phase 1 and phase 2 derivatives is obtained (Boxes 490 and 500). Gradient differences and correction factors are then calculated (Box 510). New values of phases and voltages for the next iterative calculation (i.e., for entry into Box 400) are then calculated (Box 520).

Computer Program Product for Calibration

The present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. However, software embodiments of the present invention do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

The present invention is described above with reference to block diagram and flowchart illustrations of methods, apparatus (systems) and computer program products according to embodiments of the invention. It will be understood that each block of the block diagrams and/or flowchart illustrations, and combinations of blocks, can be implemented by computer program instructions and/or hardware operations. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

It should be noted that, in some alternative embodiments of the present invention, the functions noted in the blocks may occur out of the order noted in the figures. For example, two blocks shown in succession may in fact be executed substantially concurrently or the blocks may sometimes be executed in the reverse order, depending on the functionality involved. Furthermore, in certain embodiments of the present invention, such as object oriented programming embodiments, the sequential nature of the flowcharts may be replaced with an object model such that operations and/or functions may be performed in parallel or sequentially.

The invention will now be explained in greater detail in the following non-limiting examples.

EXAMPLE 1

Phase Calibration

This calibration method is based on a measurement of the phases (rather than being an optimization technique). Below is provided a theoretical background and a detailed procedure for this calibration technique.

A. Intensity Cross Section

Figure 6:
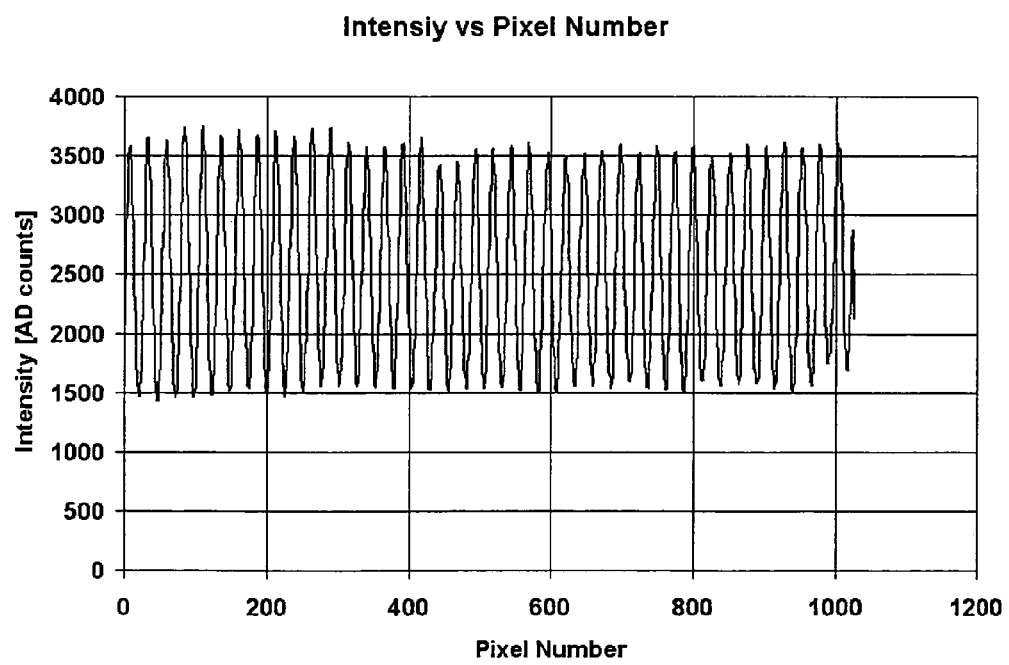
FIG. 6 is a plot of light intensity as a function of pixel number for an imaging system of the present invention.

The basis for the phase calibration technique is the intensity cross section and its Fourier Transform. Although this cross section and its transform are familiar, they are reviewed here for completeness. Shown in FIG. 6 is a cross section of a single intensity frame taken across the grid. In the calibration this data will be the average of 10 or so such cross sections for the purpose of noise reduction. Note that $2^{10}$ points=1024 points are considered in order to leverage Fast-Fourier Transform (FFT) software.

B. The Fourier Transform of the Intensity

These sections provide a basic coverage of the FFT of the intensity cross section that will be used for the phase calibration. The phase of the FFT is used for the calibration but the magnitude is utilized to determine the location of the fundamental in frequency space.

1. Magnitude of Intensity FFT

Figure 7:
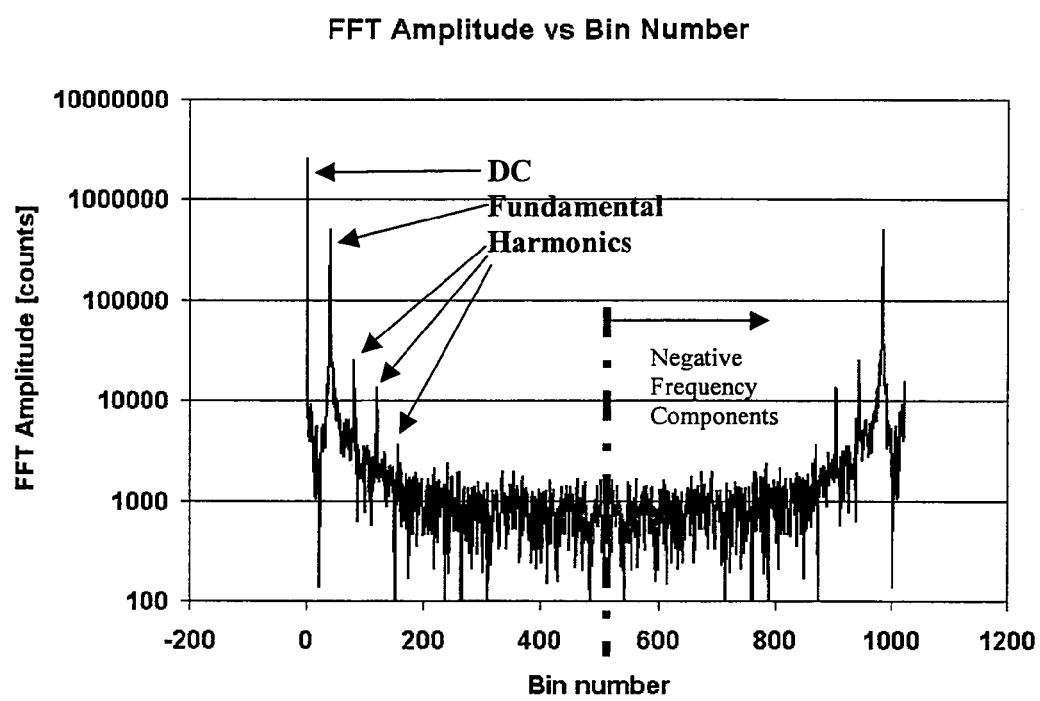
FIG. 7 is a plot of Fast Fourier Transform amplitude as a function of bin number for an imaging system of the present invention.

The plot shown in FIG. 7 is the Fourier Transform of the Intensity cross section of an imaging system. The Fourier Transform will have 1024 points. The spectrum starts at DC on the left and goes to maximum positive frequency at 512; the negative portion of the spectrum starts at point 513 to point 1024 where it ends with low negative frequency. The left half of the curve can be the focus of discussion since the right half contains redundant information.

2. Phase of Intensity FFT

Figure 8:
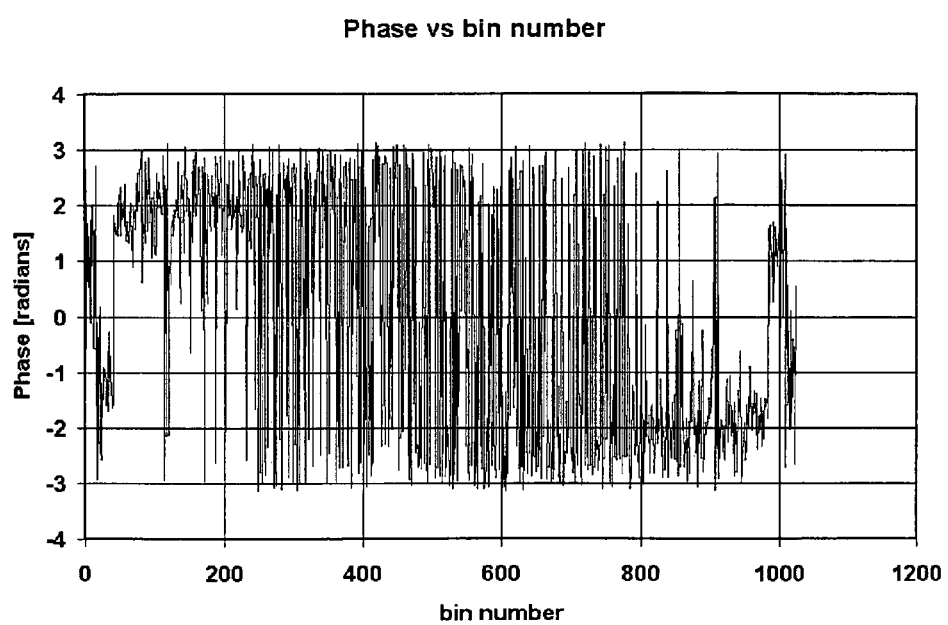
FIG. 8 is a plot of phase as a function of bin number for an imaging system of the present invention.

The phase over the entire range of frequency bins is shown in FIG. 8. This plot is not particularly relevant except near a dominant frequency, such as the fundamental near bin 40. The next section will provide a look near the fundamental frequency bin.

3. The Phase Near the Fundamental Frequency

Figure 9:
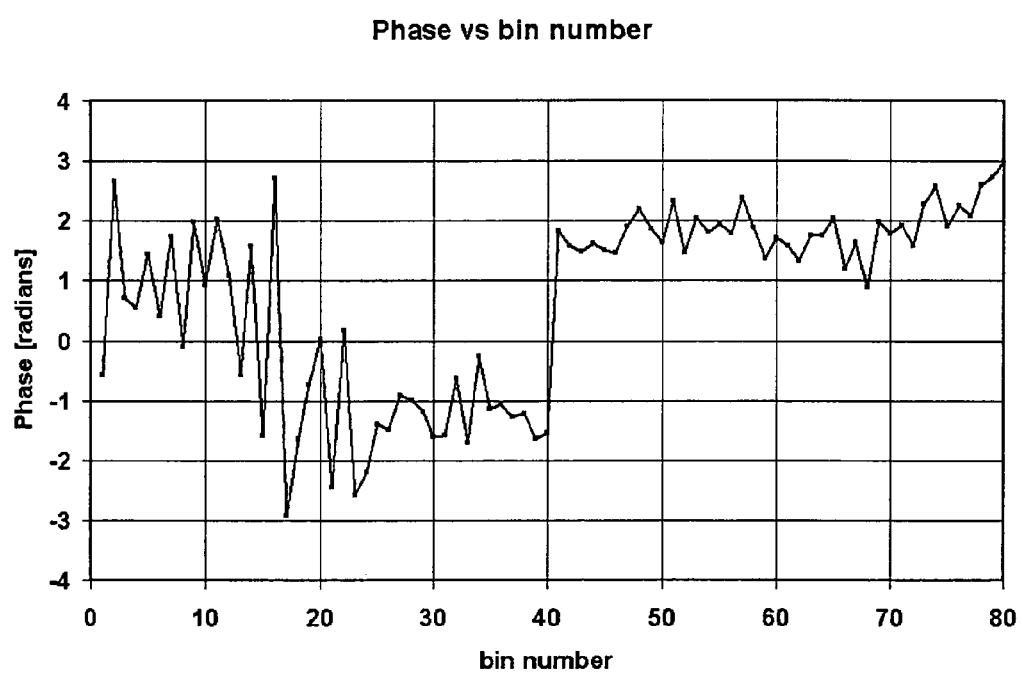
FIG. 9 is an enlarged partial plot of the plot of FIG. 8 showing the region of the fundamental.

An enlarged partial plot of the phase (FIG. 9) shows that the phase undergoes a phase jump of $\pi$ at the fundamental frequency bin 41. The phase is a meaningful quantity only in the neighborhood of the fundamental frequency peak.

C. Behavior of the Fourier Coefficients with PZT Voltage

This section demonstrates how both the amplitude and phase of the FFT behave with changing voltage (Phase) on the PZT. The magnitude should not and does not change as the voltage is varied. The phase shows a correlated dependence on the PZT voltage. The phase calibration technique is based on the change of the phase at the fundamental frequency with changing voltage. This meaning of this statement will become obvious in this section.

1. FFT Magnitude vs. Voltage

Figure 10:
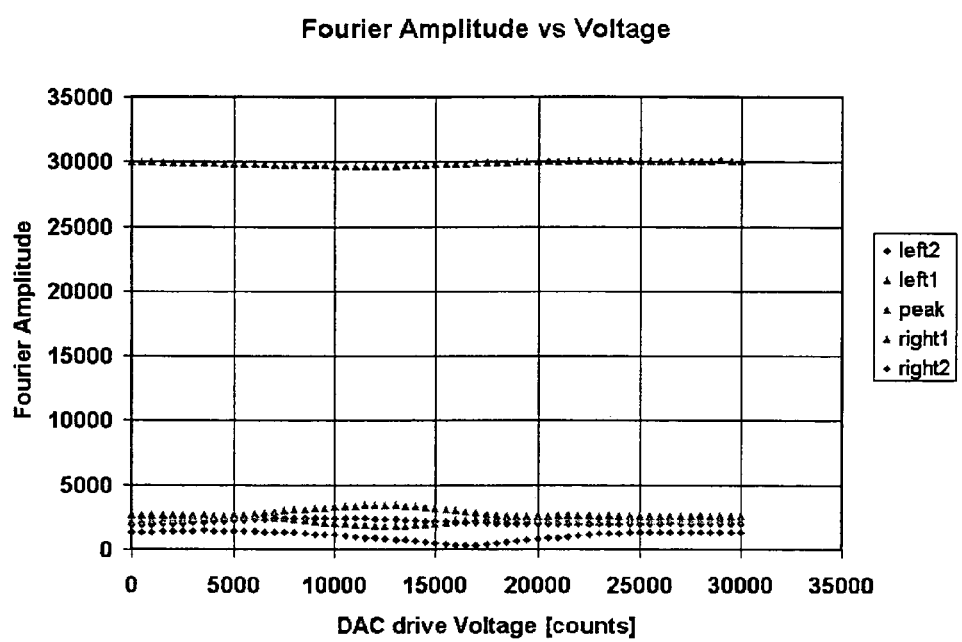
FIG. 10 is a plot of Fourier amplitude as a function of drive voltage for an imaging system of the present invention.

The magnitude of the FFT coefficients is constant over changing PZT voltage (phase). This is expected, and the plot of FIG. 10 provides proof. The amplitude of the 5 Fourier magnitude coefficients (near the peak of the fundamental) are plotted as a function of PZT voltage. Notice that the value of the Fourier magnitude coefficients do not change as the PZT voltage is ramped. It is only the phase that changes as the next section reveals.

2. FFT Phase vs. Voltage

Figure 11:
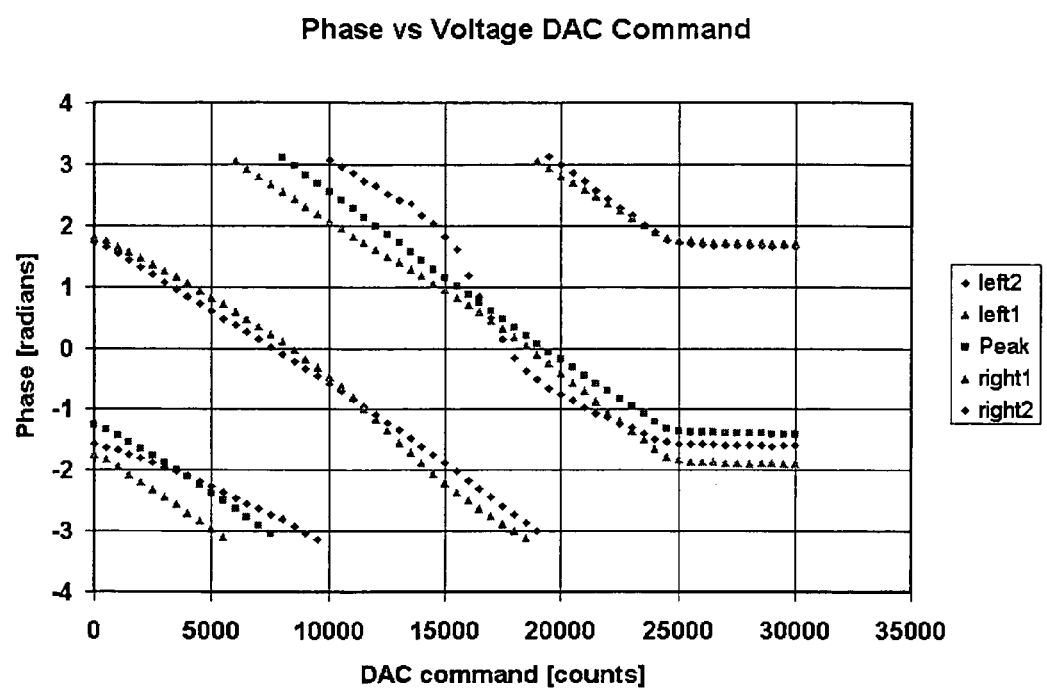
FIG. 11 is a plot of phase as a function of drive voltage for an imaging system of the present invention.

The phase of the Fourier coefficients which is the arctan (imaginary/real) is shown in FIG. 11. The phase for the 5 Fourier components, near the fundamental frequency, are shown. There are a few important facts to learn from this plot:

1. There are regions of near-linear dependence of phase vs. voltage.
2. Points to the left of the peak differ by $\pi$ from points on the right. ($\pi$, or 180 degree phase shift)
3. There is a phase jump discontinuity of $2\pi$ so the phase is always bounded by $+/-\pi$.
4. At high DA drive values the PZT stops moving because the high voltage Op-Amp has hit its maximum output voltage.
5. The phase at the peak is the highest fidelity signal.

D. Processing the Phase Information

It seems that all that is needed is to process the phase of the Fourier coefficient that corresponds to the peak value of the fundamental. The fundamental is located by the spatial frequency corresponding to the grid at the camera, and the Fourier amplitude coefficient having the largest value is used to determine the bin number of the phase coefficient that will be plotted vs. voltage to obtain the calibration curve. Averaging various coefficients near the peak was considered, but then a complicated unwrapping routine would be needed. Furthermore, the other coefficients seem to reveal worse behavior vs. voltage.

1. The Raw Phase Data vs. Voltage

Figure 12:
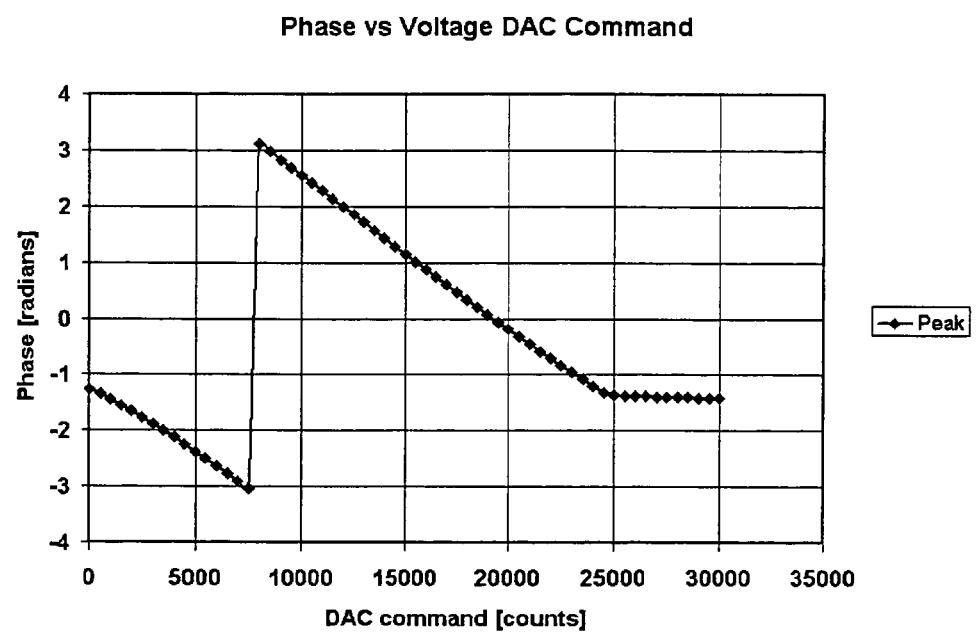
FIG. 12 is a plot of phase as a function of drive voltage for an imaging system of the present invention showing a $2\pi$ discontinuity in the data set.
Figure 13:
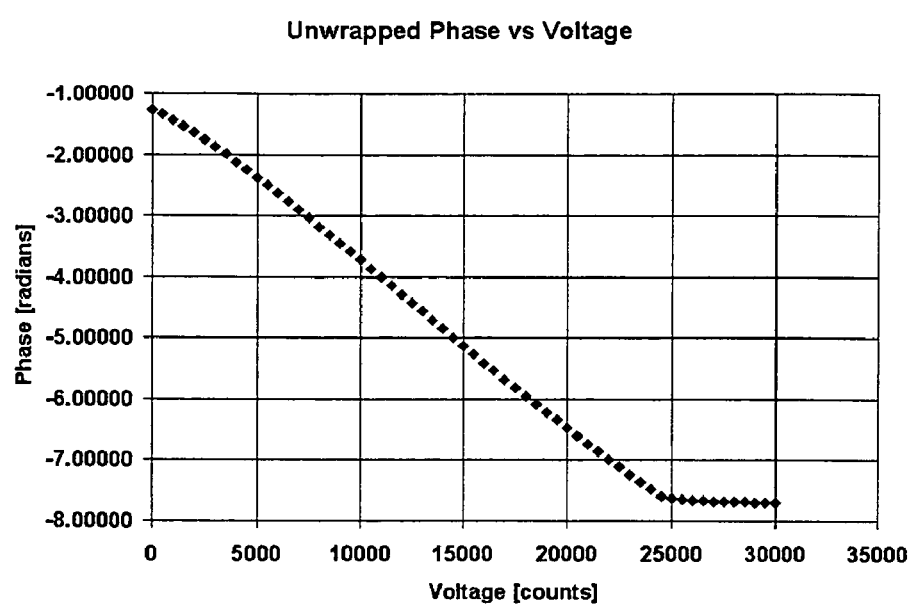
FIG. 13 is a plot of unwrapped phase as a function of voltage for an imaging system of the present invention.

FIG. 12 shows the phase calculated at the bin corresponding to the peak amplitude of the fundamental frequency. Notice the $2\pi$ phase-wrap at about 7000 counts. Also notice the zero slope near 25000 counts. Both these features should be identified and removed from the data in order to accurately use the data for calibration. The next sections show how this can be done.

2. The Unwrapped Phase vs. Voltage Plot

The first step is to unwrap the $2\pi$ phase discontinuity. This is done by looking for a $2\pi$ phase jump and then removing it by adding or subtracting $2\pi$ to all subsequent data points. This is done in a software loop to produce the unwrapped phase plot shown in FIG. 13. Next there is a need to eliminate the region at the large drive voltage end where the amplifier has been saturated and no further voltage increase accompanies increasing drive counts.

3. Using the Derivative to Eliminate Low Response Regions

Figure 14:
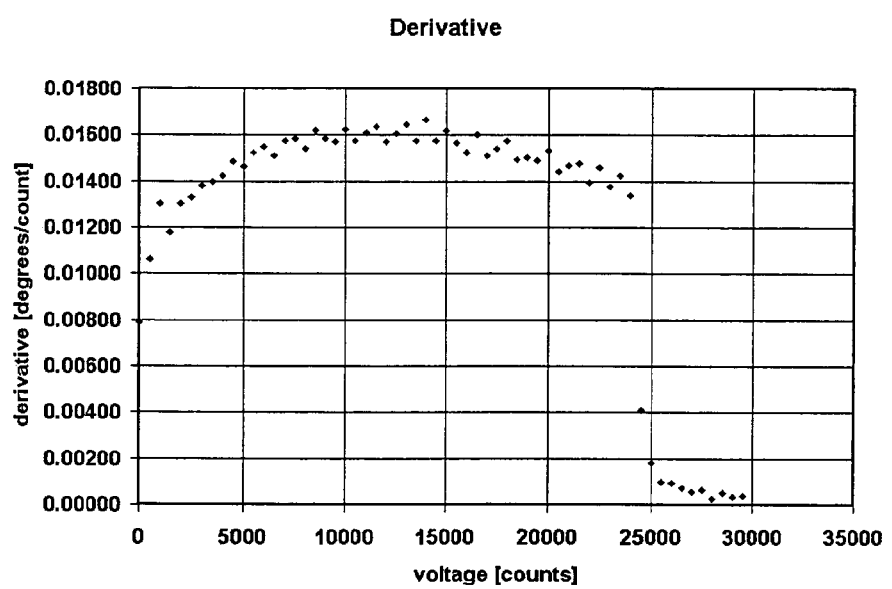
FIG. 14 is a plot of the derivative of phase-voltage data as a function of voltage for an imaging system of the present invention.

To eliminate the undesirable low or zero response regions of the Phase vs. Voltage response function, the nearest-neighbor derivative of the data is taken. FIG. 14 shows this for the data file in the last couple of sections. The derivative varies slowly between 1000 and 24000 counts drive voltage. This data can be smoothed to find the maximum and eliminate points corresponding to derivative values that are less than, for example, one half of the maximum slope of 0.016 on this graph. This will eliminate the first data point as well as the last several.

4. Final Processed Phase Response Function

After eliminating the low response points the remaining data is plotted in FIG. 15. This is the data that will be used by the phase calibration routine to determine the three voltage values for the three phases of the imaging system. To understand the nature of the curve the data is fit to a linear and cubic function and the coefficients of each are shown on the plot of FIG. 15.

5. Deviations from Global Linear and Cubic Fits

Figure 16:
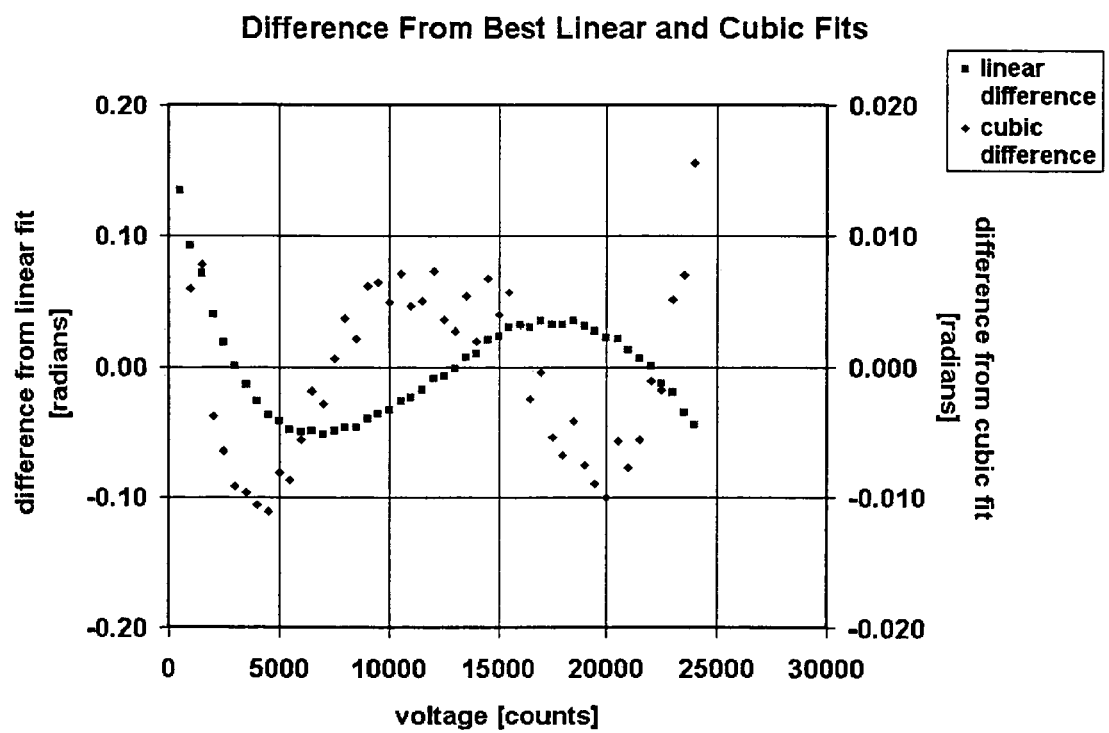
FIG. 16 is a plot of the difference between data points and a fitted curve for both linear and cubic curve-fitting techniques for an imaging system of the present invention.

The data from the previous section was fit to linear and cubic equations. FIG. 16 shows the deviation of the global fit equations from the data. The linear fit shows deviations that are as high as 0.05 radians or about 3 degrees. This level of deviation is typically unacceptable since the tolerance is about 0.5 degrees for the calibration. The cubic fit shows deviations of about 0.01 radian or about 0.6 degrees. This level of fit is marginally acceptable. The conclusion here is that if a global polynomial fit is to be used to establish the proper voltages, then the order of polynomial should be cubic or higher to obtain good results.

E. Steps in Phase vs. Voltage Calibration Procedure

The phase vs. voltage calibration can be carried out by performing the following steps:

Preliminary
1. Setup
   a. Put an optical flat in the field of view.
   b. Adjust focus and light level properly.
   c. Activate calibration.
2. Take 10 intensity cross section perpendicular to the lines in the image.
   a. Use FFT to determine orientation of the lines.
3. Average the intensity cross sections to obtain a single intensity cross section data set.
4. Take FFT to obtain amplitude and phase information.
5. Find the fundamental.
   a. Away from DC
   b. In neighborhood of expected grid
6. Find the noise floor.
   a. Noise floor determined at 4f to infinity frequency average
7. Compute fundamental/noisefloor ratio>threshold.

Take Phase Data

8. Collect phase data at regularly spaced voltages.
9. Phase is calculated using the phase point at the same frequency bin as the fundamental peak. This should not change over entire voltage range.

Unwrap Phase Data

10. Look at nearest neighbor changes (Derivative).
11. If change is a then add or subtract $<\pi$ and check for change $<\pi$.

Calculate Derivative vs. Voltage to Establish Valid Points

12. Take nearest neighbor differences.
13. Find maximum amplitude derivative.
14. Eliminate points whose nearest neighbor derivative <0.5 of maximum.

Establish Phase 1,2,3 Voltages

15. Phase 3 Voltage is largest voltage of filtered data set.
16. Find nearest data point to calculated Phase 1,2 values that differ from phase 3 by 120 and 240 degrees.
17. Perform linear regression in neighborhood of phase 1 and Phase 2 voltages with +/−2 neighbors to interpolate exact voltages. This can be done by interpolation after a nearest neighbor low-pass filtering of the data.

EXAMPLE 2

Merit Function Calibration

The fidelity of the calibration can be determined by analyzing the second harmonic content of the residual lines. It has been found that the calibration error is the only thing that produces second harmonic residual lines. Therefore, the second harmonic content of the residual lines can be a metric function for the calibrations. The algorithm could be a damped optimization routine based on this merit function.

A. Calibration Merit Function Theory

Because the fidelity of the calibration is known to directly affect the second harmonic content of the imaging system data, what follows is a detailed look at this function vs. detuning of the calibration phases of the imaging system. A detailed procedure for evaluating the merit function from actual imaging system data is also discussed in this section.

1. Merit Function for Small Detuning

Figure 17:
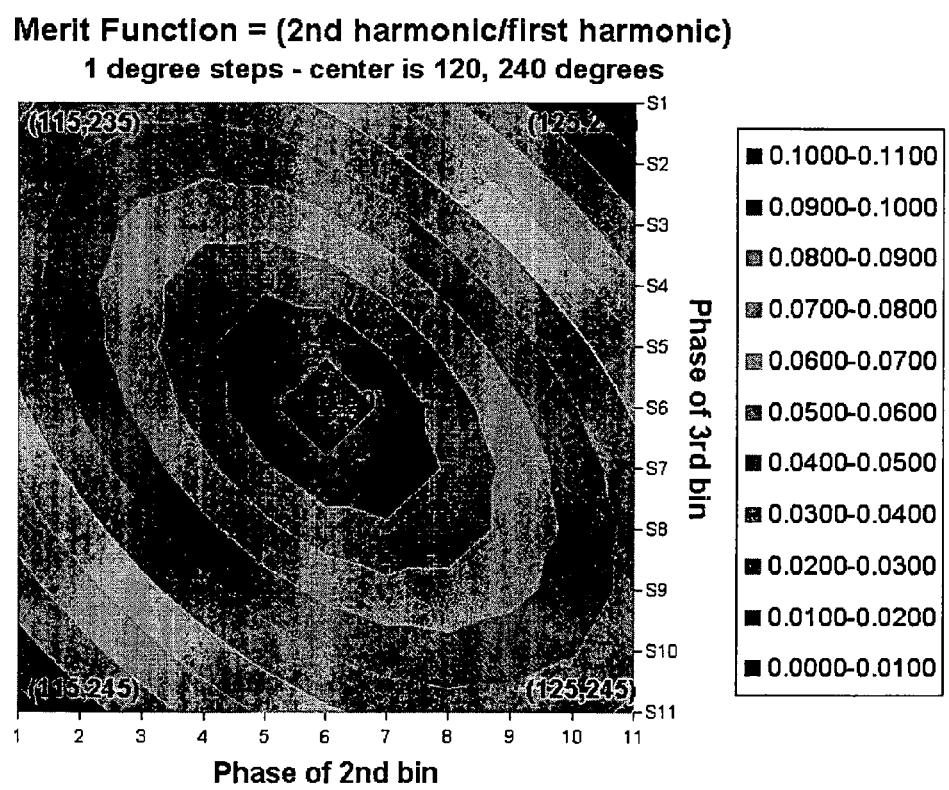
FIG. 17 is a plot of a merit function for small detuning (i.e., steps=1 degree) of a second harmonic for an imaging system of the present invention.

FIG. 17 shows the behavior of the second harmonic (normalized to the fundamental) for small deviations from the ideal calibration condition of $\Phi_1=0$ degrees, $\Phi_2=120$ degrees, $\Phi_3=240$ degrees. The second and third phases were varied over a range of +/−5 degrees in 1-degree increments to form this 3-D plot of the proposed merit function. This curve shows that the merit function is a smooth function in the neighborhood of the ideal calibration solution.

Figure 18:
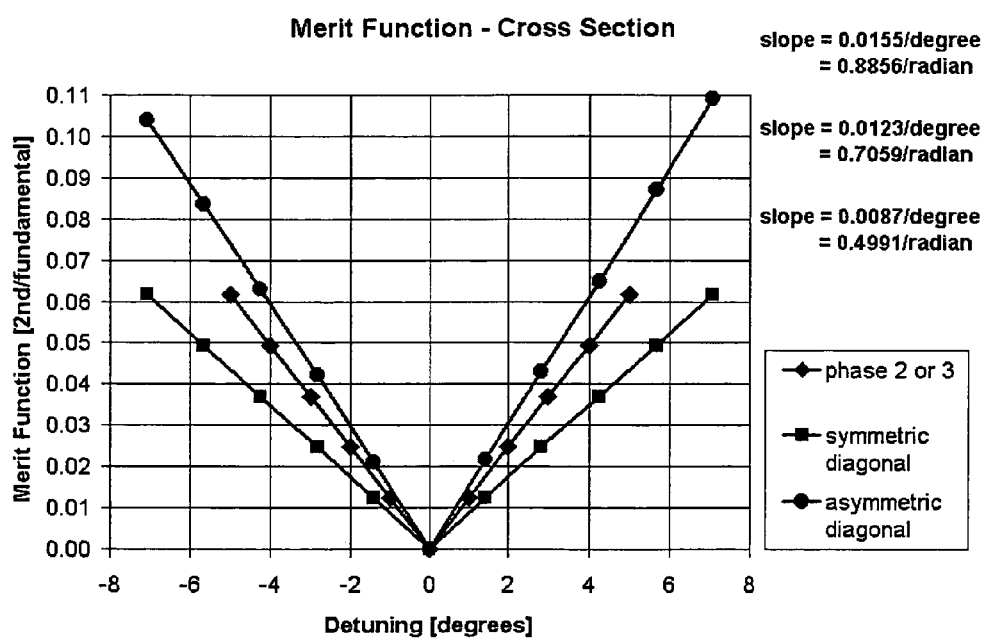
FIG. 18 is a plot of a cross-section of the merit function of FIG. 17.

The trajectory through the solution on the merit function surface is V-shaped. That is, there is a linear dependence of the merit function toward the solution. FIG. 18 illustrates this point. Shown are cross sections through the plot for small phase variation. Cross sections that correspond to varying either phase 2 or phase 3 alone are the same. Cross sections along the minor and major axes of the function are also shown. This data is useful in establishing the step sizes to take when establishing the derivative as well as the correction of the function.

Since the maximum slope is 0.0155/degree, this should be used to determine the step size taken to determine the derivative. Since it is not desirable to go through the solution when establishing the slope, a step size should be selected that is smaller than the step that would zero out the merit function. This step size should also be small enough not cross into the nonlinear region or exit the basin of attraction.

2. Merit Function for Medium Detuning

Figure 19:
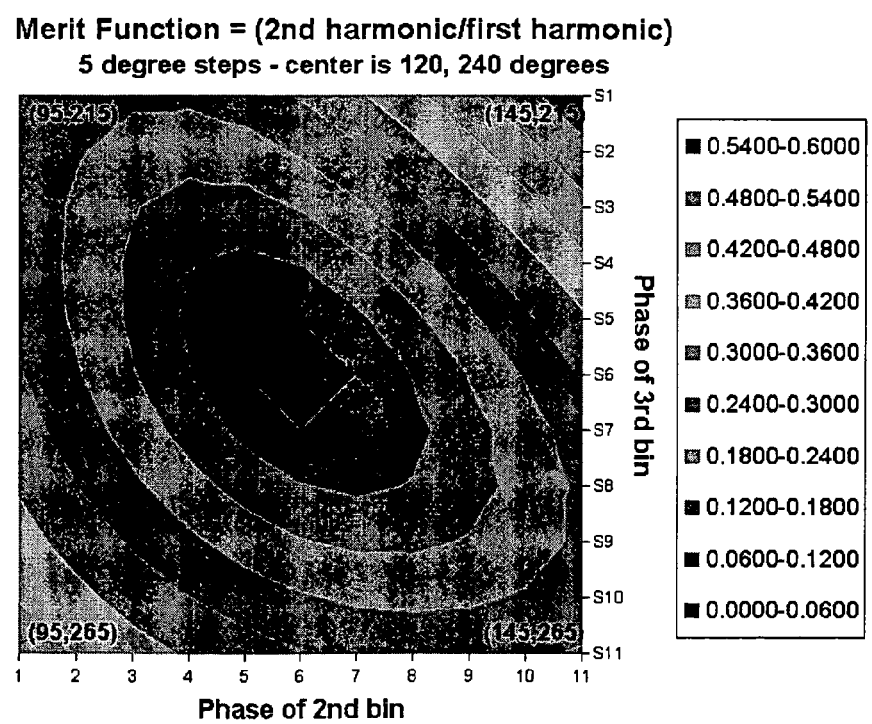
FIG. 19 is a plot of a merit function for medium detuning (i.e., steps=5 degrees) of a second harmonic for an imaging system of the present invention.
Figure 20:
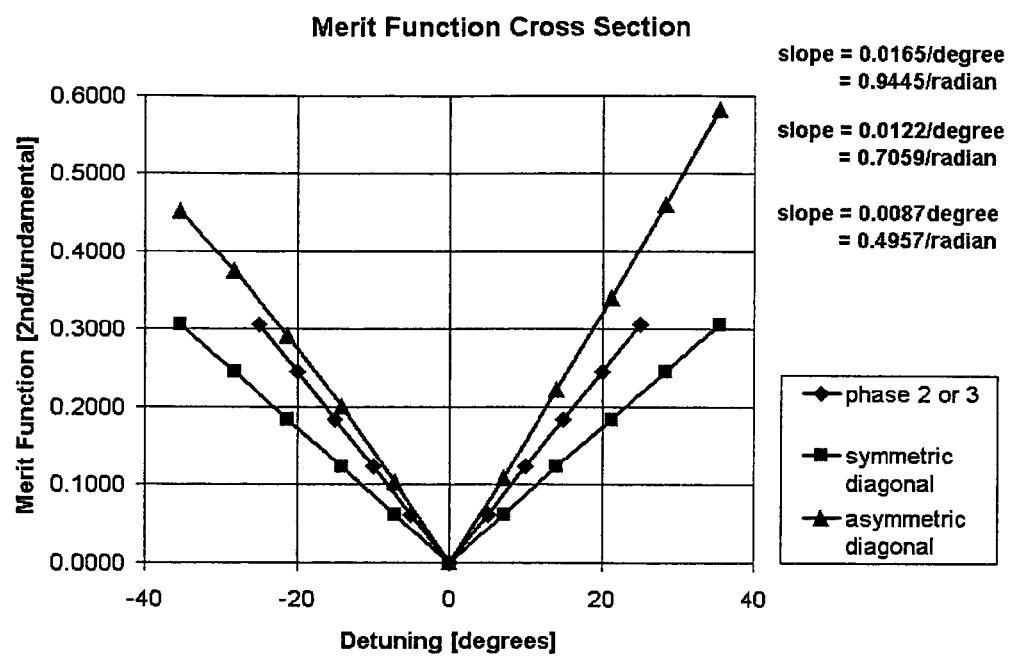
FIG. 20 is a plot of a cross-section of the merit function of FIG. 19.

FIG. 19 shows the behavior of the second harmonic (normalized to the fundamental) for larger deviations from the ideal calibration condition of $\phi_1=0$ degrees, $\Phi_2=120$ degrees, $\Phi_3=240$ degrees. The second and third phases were varied over a range of +/−25 degrees in 5-degree increments to form this 3D plot of the proposed merit function. FIG. 19 shows that in this range the merit function still converges monotonically on the solution. However, there is some deviation in the way the function behaves in the upper right corner of the plot.

When the cross sections of the merit function are plotted (FIG. 20), some non-linearity of the cross sections appears. One side of the merit function is obviously higher than the other. Notice that the magnitudes of the slopes are different than for the previous small detuning plots.

3. Merit Function for Large Detuning

FIG. 21 shows the behavior of the second harmonic (normalized to the fundamental) for larger deviations from the ideal calibration condition of $\Phi_1=0$ degrees, $\Phi_2=120$ degrees, $\Phi_3=240$ degrees. The second and third phases were varied over a range of +/−100 degrees in 20-degree increments to form this 3D plot of the proposed merit function. This plot shows that as the initial error from the ideal solution is expanded, the possibility of going "down hill" in the wrong direction arises. By this most lenient criterion, one can define the basin of attraction of the best solution as a detuning that produces a merit function value of no more than 0.7. At that point the downhill direction would be away from the desired solution where all the phases are in order (i.e., 0,120,240).

Figure 22:
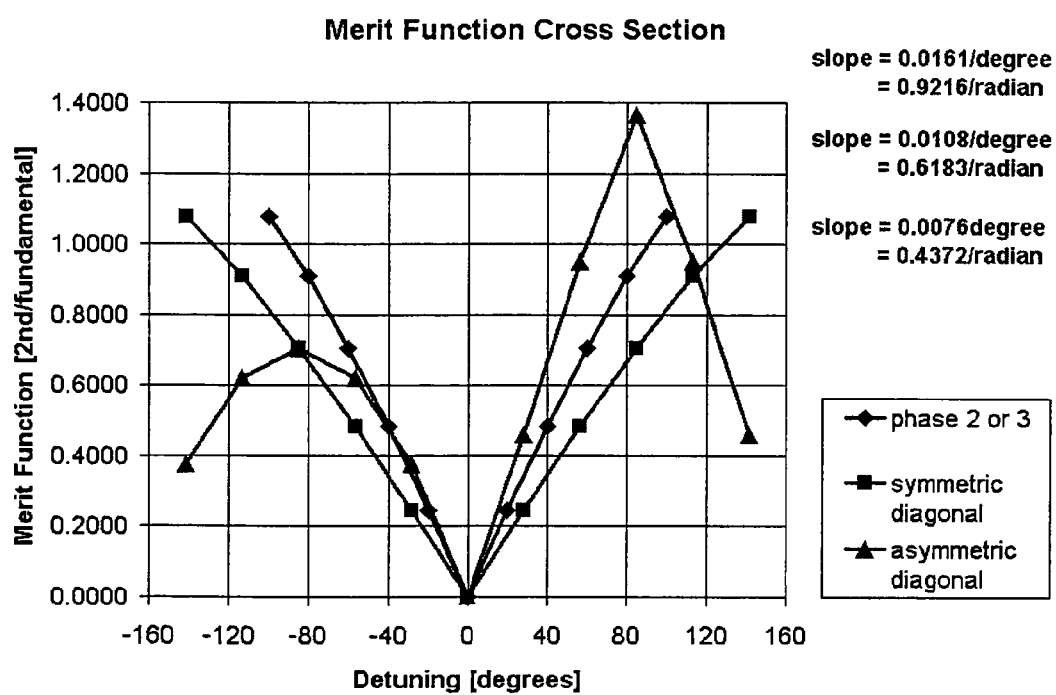
FIG. 22 is a plot of a cross-section of the merit function of FIG. 21.

FIG. 22 shows a plot of the cross sections of the merit function. Severe non-linearity of the cross sections appear in FIG. 22. One side of the merit function is obviously higher than the other. Notice that the magnitudes of the slopes are different than for the previous small detuning plots. The slopes were calculated for the right side of the curves where they are the largest.

One additional observation that this plot supports is that any value of the merit function near 0.7 could indicate that the errors may be outside of the basin of attraction. It is important that all data be taken for angular errors less than 80 degrees and merit function values not approaching the 0.7 ratio.

B. Experimental Merit Function Behavior

Figure 24:
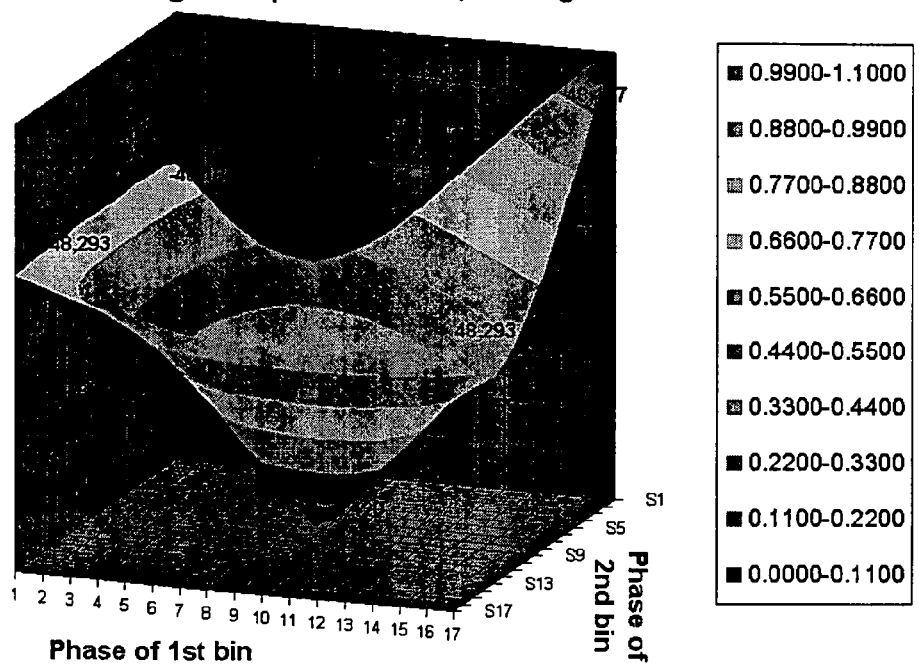
FIG. 24 is a perspective view of a three-dimensional plot of the merit function of FIG. 23.

FIG. 23 is a plot of Merit Function data taken from an imaging system by varying the detuning and recording the Merit Function. FIG. 24 shows the oblate conical shape of the merit function. The direction directly down hill is linear in all directions for small offsets from the solution. FIG. 25 shows the cross sections through the experimental merit function. Even though there were some hysteresis issues while taking this data the slopes agree with those of the theoretical model.

C. Merit Function Optimization Calibration Procedure

The following steps provide an outline for the software calibration of an imaging system using Merit function minimization:

A. For a Starting Point Characterized by:
  Phases: Phase1, Phase2, Phase3
  Voltages: Vphase1, Vphase2, Vphase3
  1) Take imaging system trio of frames at current phase 1,2,3 settings.
    2) Use one intensity frame for normalization.
      a. Average 10 cross sectional lines in center of frame. There should be 1024 point data sets for FFTs.
      b. Take FFT of resulting average.
      c. Find fundamental peak at point f.
      d. Average the peak and two neighbors (=fundamentalaverage).
      e. Find Intensitynoise floor (=average (point 4f to point 512)).
      f. If fundamentalaverage/Intensitynoise<50; then error (not enough contrast calibration error).
    3) Process imaging system trio of frames.
    4) Find Second Harmonic and Merit Function.
      a. Average same 10 cross sectional lines in center of frame.
      b. Take FFT of resulting average.
      c. Average second harmonic plus two neighbors (SH at point 2N).
      d. Find OGnoise floor=average (10 points on either side of points used for SH peak).
      e. Find STD deviation over same region.
      f. Find SHaverageAbsolute=SecondHarmonicAverage−NoiseFloorAverage.
      g. If result<N sigma, then the system is calibrated (exit criterion–N~1–2 works)

h. Calculate the MeritFunction0=SHaverageAbsolute/fundamentalaverage.

Note that this procedure takes the derivative at the current point (point0). Corrections should be performed from this point. It is important to keep track of changes from the current state (i.e. on the derivative phases or on the current solution phases).

Figure 26:
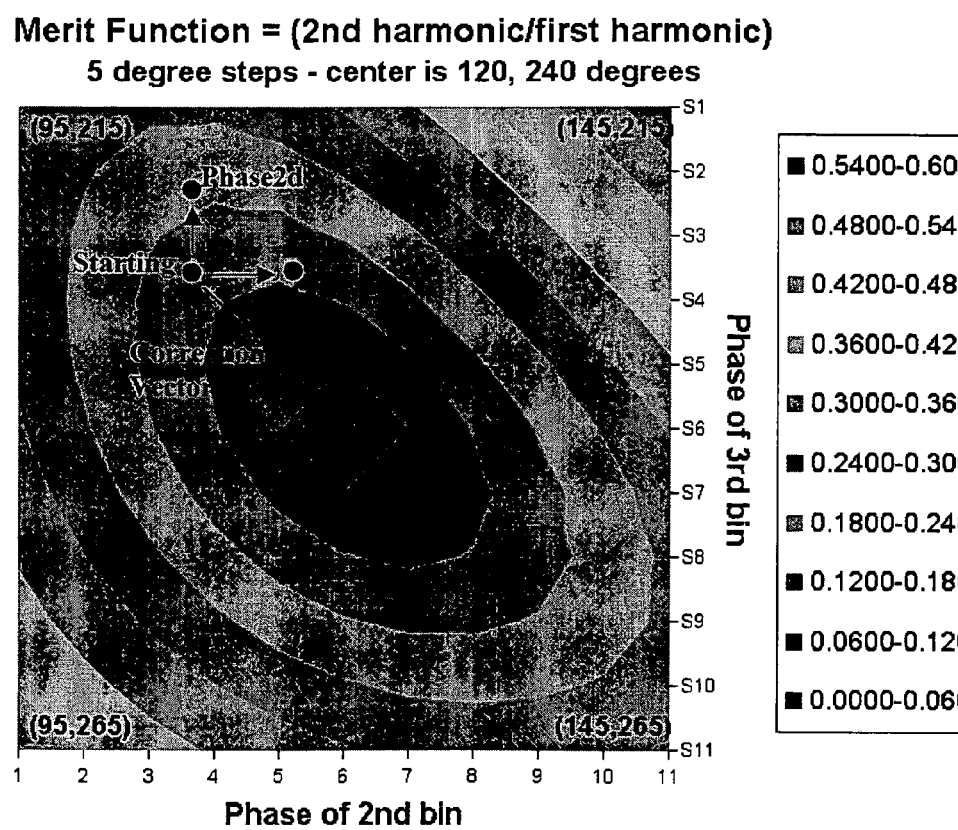
FIG. 26 is a plot of the experimental merit function of FIG. 23 showing the starting point and a correction vector.

B. Taking the Derivative of the Merit Function at the Current Calibration Setting (see FIG. 26)

5) Determine the phase and voltage step sizes.
  a. Pull up current Merit Function Value (as calculated in previous steps).
  b. PhaseStepsize=Stepfactor*MeritFUnctionValue/(maxslope=0.0165 per degrees.
    i. Stepfactor is unknown–start with 0.5.
  c. Voltagestepsize=phasestepsize/phasepervoltageslope (phase/voltage slope is entered parameter for now).
    i. In general there may be a different slope for phase1 and phase 2.
    ii. These could be provided from derivative of phase vs. voltage plot.
6) Calculate Differential phase values.
  a. Current phases are phase1, phase2, phase3.
  b. Derivative phases are phase1d, phase2, phase 3 for phase1 derivative.
    i. Phase1d=phase1+phaseStepSize
  c. Derivative phases are phase1, phase2d, phase2 for phase2 derivative.
    i. Phase2d=phase2+phaseStepSize
7) Calculate Derivative voltage values.
  a. Current voltages are vphase1, vphase2, vphase3.
  b. Derivative voltage settings are vphase1d, vphase2, vphase3 for phase 1 derivative.
    i. Vphase1d=vphase1+Voltage1stepsize
  c. Derivative voltage settings are vphase1, vphase2d, vphase3 for phase 1 derivative.
    i. Vphase2d=vphase2+Voltage2stepsize
8) Take imaging system data for phase 1 derivative.
  a. Take 3 frames at Vphase1d, Vphase2, Vphase3.
  b. Use procedure in step 4 to calculate Meritfunction1.
9) Take imaging system data for phase 2 derivative.
  a. Take 3 frames at Vphase1, Vphase2d, Vphase3.
  b. Use procedure in step 4 to calculate Meritfunction2.
10) Calculate Gradient Differences and Correctionfactors.
  a. Calculate Delta1=(MeritFunction1−MeritFunction0).
  b. Calculate Delta2=(MeritFunction2−MeritFunction0).
  c. Calculate Deltamag=sqrt(Delta1^2+Delta2^2).
  d. Correctionfactor1=Delta1/Deltamag
  e. Correctionfactor2=Delta2/Deltamag
11) Calculate new values for phases and voltages to start step 1 again (steps are from point0).
  a. PhaseCorrection1=Correctionfactor1*MeritFunctionValue/(maxslope)
    i. VoltageStepSize1=PhaseCorrection1/phasepervoltageslope
  b. PhaseCorrection2=Correctionfactor2*MeritFunctionValue/(maxslope)
    i. VoltageStepSize2=PhaseCorrection2/phasepervoltageslope C. The New Point is Characterized by:
Phases: Phase1—PhaseStepsize1, phase2—PhaseStepsize2, phase3
Voltages: Vphase1—VoltageStepSize1, Vphase2—VoltageStepSize2, Vphase3

The entire sequence is iterated until the exit condition (see step 4 g) is met. Typically, SecondHarmonicAbsolute<N*Sigma, where Sigma is standard deviation of imaging system FFT noise floor near the second harmonic.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A method of calibrating an imaging system, the imaging system including a light source, a substrate for supporting an object, a patterning mask that generates a substantially periodic spatial pattern on the object, a phase shifter that adjusts the relative position of the patterning mask and object to shift the position of the pattern on the object, a detector that detects images of the object, and an analyzer that analyzes at least three images of the object, each of which represents a different spatial shift of the pattern, the analyzer being configured to remove the spatial pattern from the images to generate an optically sectioned image of the object, the method comprising:
  calibrating the position of the mask relative to the substrate via a phase-voltage technique;
  calibrating the position of the mask relative to the substrate via a merit function technique; and
  operating the calibrated imaging system.

2. The method defined in claim 1, wherein the step of calibrating via a phase-voltage technique precedes the step of calibrating via a merit function technique.

3. The method defined in claim 2, wherein the step of calibrating via a merit function technique is performed with values of phase and voltage generated in the step of calibrating via a phase-voltage technique.

4. The method defined in claim 1, wherein the mask generates a pattern of stripes on the object.

5. The method defined in claim 4, wherein each of the stripes varies sinusoidally in intensity.

6. The method defined in claim 4, wherein the stripes are spatially separated from one another by between about 5 to 30 microns.

7. The method defined in claim 1, wherein the step of calibrating via a merit function comprises analyzing a second harmonic of a fundamental frequency.

8. The method defined in claim 7, wherein the step of analyzing a second harmonic comprises iteratively calculating the ratio of the second harmonic to the fundamental frequency until the value is below a predetermined threshold.

9. The method defined in claim 1, wherein the phase shifter comprises a piezoelectric device that adjusts the position of the mask.

10. The method defined in claim 9, wherein the step of calibrating via a phase voltage technique comprises establishing a phase-voltage curve based on a cubic curve-fitting function.

11. The method defined in claim 10, wherein the step of calibrating via a phase voltage technique further comprises:
  (a) identifying phase 1 and phase 2 data points of phase and voltage on the phase voltage curve that are nearest calculated values for phase and voltage; and (b) interpolating between the identified phase 1 and phase 2 data points to establish definitive phase 1 and phase 2 voltages.

12. An imaging system including a light source, a substrate for supporting an object, a patterning mask that generates a substantially periodic spatial pattern on the object, a phase shifter that adjusts the relative position of the patterning mask and object to shift the position of the pattern on the object, a detector that detects images of the object, and an analyzer that analyzes at least three images of the object, each of which represents a different spatial shift of the pattern, the analyzer being configured to remove the spatial pattern from the images to generate an optically sectioned image of the object, the system further comprising:

means for calibrating the position of the mask relative to the substrate via a phase-voltage technique; and means for calibrating the position of the mask relative to the substrate via a merit function technique.

13. The system defined in claim 12, wherein the system is configured such that the means for calibrating via a merit function technique utilizes data generated by the means for calibrating via a phase-voltage technique.

14. The system defined in claim 12, wherein the mask generates a pattern of stripes on the object.

15. The system defined in claim 14, wherein each of the stripes varies sinusoidally in intensity.

16. The system defined in claim 15, wherein the stripes are spatially separated from one another by between about 5 to 30 microns.

17. The system defined in claim 12, wherein the means for calibrating via a merit function comprises mean for analyzing a second harmonic of a fundamental frequency.

18. The system defined in claim 17, wherein the means for analyzing a second harmonic comprises iteratively calculating the ratio of the second harmonic to the first harmonic until the value is below a predetermined threshold.

19. The system defined in claim 12, wherein the phase shifter comprises a piezoelectric device that adjusts the position of the mask.

20. The system defined in claim 19, wherein the means for calibrating via a phase voltage technique comprises means for establishing a phase-voltage curve.

21. A computer program product for calibrating an imaging system, the imaging system including a light source, a substrate for supporting an object, a patterning mask that generates a substantially periodic spatial pattern on the object, a phase shifter that adjusts the relative position of the patterning mask and the object to shift the position of the pattern on the object, a detector that detects images of the object, and an analyzer that analyzes at least three images of the object, each of which represents a different spatial shift of the pattern, the analyzer being configured to remove the spatial pattern from the images to generate an optically sectioned image of the object, the computer program product comprising a computer usable storage medium having computer readable program code embodied in the medium, the computer readable program code comprising:

computer readable program code that calibrates the imaging system using a phase-voltage technique; and computer readable program code that calibrates the imaging system using a merit function technique.

22. The computer program product defined in claim 21, wherein the computer readable program code that calibrates the imaging system via a merit function technique is configured to employ phase and voltage data generated by the computer readable program code that calibrates the imaging system via a phase-voltage technique.

23. The computer program product defined in claim 21, wherein the computer readable program code for calibrating via a merit function comprises computer readable program code for analyzing a second harmonic.

* * * * *